(12) United States Patent
Alexander et al.

(10) Patent No.: US 12,378,409 B1
(45) Date of Patent: Aug. 5, 2025

(54) HIGH CONTRAST LASER MARKABLE CABLES AND MARKING METHODS

(71) Applicant: Southwire Company, LLC, Carrollton, GA (US)

(72) Inventors: Pill Alexander, Carrollton, GA (US); Juan Alberto Galindo Gonzalez, Powder Springs, GA (US)

(73) Assignee: Southwire Company, LLC, Carrollton, GA (US)

( * ) Notice: Subject to any disclaimer, the term of this patent is extended or adjusted under 35 U.S.C. 154(b) by 203 days.

(21) Appl. No.: 17/226,483

(22) Filed: Apr. 9, 2021

Related U.S. Application Data

(60) Provisional application No. 63/007,494, filed on Apr. 9, 2020.

(51) Int. Cl.
| | | |
|---|---|---|
| *C08L 77/00* | (2006.01) | |
| *B41M 5/26* | (2006.01) | |
| *B41M 5/44* | (2006.01) | |
| *C08L 23/26* | (2006.01) | |
| *H01B 3/30* | (2006.01) | |

(Continued)

(52) U.S. Cl.
CPC .............. *C08L 77/00* (2013.01); *B41M 5/265* (2013.01); *B41M 5/267* (2013.01); *B41M 5/44* (2013.01); *C08L 23/26* (2013.01); *H01B 3/305* (2013.01); *H01B 3/441* (2013.01); *H01B 7/365* (2013.01); *C08L 2205/06* (2013.01);
(Continued)

(58) Field of Classification Search
CPC ...... C08L 77/00; C08L 23/26; C08L 2205/06; C08L 2207/322; B41M 5/265; B41M 5/267; B41M 5/44; H01B 3/305; H01B 3/441; H01B 7/365; H01S 3/06716
See application file for complete search history.

(56) References Cited

U.S. PATENT DOCUMENTS

| | | |
|---|---|---|
| 3,616,918 A | 11/1971 | Diemond et al. |
| 3,701,277 A | 10/1972 | McMahon et al. |

(Continued)

FOREIGN PATENT DOCUMENTS

| | | | | |
|---|---|---|---|---|
| CA | 1284125 C | * | 5/1991 | ............... B41M 1/30 |
| CN | 102417646 A | | 4/2012 | |

(Continued)

OTHER PUBLICATIONS

PolyOne Corporation, Faster Runs and Better Legibility with New OnCap™ Laser Marking Formulations, Oct. 18, 2016, https://www.avient.com/news/faster-runs-and-better-legibility-new-oncap-laser-marking-formulations (Year: 2016).*

(Continued)

*Primary Examiner* — Peter Radkowski
(74) *Attorney, Agent, or Firm* — Merchant & Gould P.C.

(57) ABSTRACT

Cable sheathing compositions are provided for use in laser marking methods. Cable sheathing compositions include amounts of laser marking additives and color concentrates to enhance the absorption of laser energy and create an indelible mark. Laser marking methods employ cables formed with sheathing compositions and provide advantages to both the speed and power efficiency required by the laser source, as well as the quality and contrast ratio of the resulting laser mark. Cable manufacturing methods and apparatus employing the laser marking methods are also contemplated.

18 Claims, 15 Drawing Sheets

(51) Int. Cl.
*H01B 3/44* (2006.01)
*H01B 7/36* (2006.01)
H01S 3/067 (2006.01)
H01S 3/16 (2006.01)

(52) U.S. Cl.
CPC ..... *C08L 2207/322* (2013.01); *H01S 3/06716* (2013.01); *H01S 3/1618* (2013.01)

(56) References Cited

U.S. PATENT DOCUMENTS

| | | |
|---|---|---|
| 4,808,966 A | 2/1989 | Ferlier et al. |
| 5,053,440 A * | 10/1991 | Schueler ............... C08K 3/32 |
| | | 524/413 |
| 5,560,845 A | 10/1996 | Birmingham, Jr. et al. |
| 6,370,304 B1 | 4/2002 | Mills et al. |
| 6,617,515 B1 | 9/2003 | Yeung |
| 6,825,265 B2 | 11/2004 | Daga et al. |
| 6,846,536 B1 | 1/2005 | Priesnitz et al. |
| 6,924,077 B2 | 8/2005 | Delp et al. |
| 7,169,471 B1 | 1/2007 | Dreher et al. |
| 7,202,288 B2 | 4/2007 | Kniess et al. |
| 7,541,088 B2 | 6/2009 | Bennett et al. |
| 7,557,301 B2 | 7/2009 | Kummer et al. |
| 7,674,854 B2 | 3/2010 | Tada et al. |
| 8,043,119 B2 | 10/2011 | Kummer et al. |
| 8,234,304 B2 * | 7/2012 | Holcombe ............... H01B 7/365 |
| | | 707/790 |
| 8,382,518 B2 | 2/2013 | Chambers et al. |
| 8,788,221 B2 | 7/2014 | Hooper |
| 8,800,967 B2 | 8/2014 | Carlson et al. |
| 8,911,658 B2 * | 12/2014 | Jiang ................... B41J 2/442 |
| | | 372/18 |
| 8,936,153 B1 | 1/2015 | Temblador et al. |
| 8,986,586 B2 | 3/2015 | Sasse et al. |
| 9,010,998 B2 | 4/2015 | Springer, III |
| 9,079,745 B2 | 7/2015 | Galindo Gonzalez et al. |
| 9,142,236 B1 | 9/2015 | Mahnad |
| 9,145,219 B1 | 9/2015 | Temblador et al. |
| 9,403,659 B2 | 8/2016 | Galindo Gonzalez et al. |
| 9,431,152 B2 | 8/2016 | Sasse et al. |
| 9,617,112 B1 | 4/2017 | Temblador et al. |
| 9,746,380 B2 | 8/2017 | Ribi |
| 9,780,542 B2 | 10/2017 | Galindo et al. |
| 9,796,494 B1 | 10/2017 | Temblador et al. |
| 9,828,209 B2 | 11/2017 | Temblador et al. |
| 9,864,381 B2 | 1/2018 | Carlson et al. |
| 9,867,300 B1 | 1/2018 | Fowler, Jr. et al. |
| 9,881,714 B2 * | 1/2018 | Adamchuk ............ H01B 3/445 |
| 10,114,190 B2 * | 10/2018 | Carberry ................ B41J 2/01 |
| 10,256,009 B2 * | 4/2019 | Adamchuk ............ H01B 3/004 |
| 10,290,398 B2 * | 5/2019 | Prange ................ G02B 6/4416 |
| 10,620,395 B2 * | 4/2020 | Carberry ................ B41M 5/24 |
| 2004/0077760 A1 | 4/2004 | Yeung |
| 2008/0029152 A1 * | 2/2008 | Milshtein ........... H01L 31/0465 |
| | | 257/E27.125 |
| 2008/0066946 A1 * | 3/2008 | Kummer ............... H01B 3/443 |
| | | 174/121 A |
| 2009/0138514 A1 * | 5/2009 | Holcombe ............. G08B 13/14 |
| 2009/0207876 A1 * | 8/2009 | Henriksson ............. G02F 1/39 |
| | | 372/102 |
| 2013/0037992 A1 * | 2/2013 | Milshtein ........... B23K 26/0736 |
| | | 219/492 |
| 2013/0251929 A1 * | 9/2013 | Gabriel .................... C08K 5/21 |
| | | 564/57 |
| 2013/0279527 A1 * | 10/2013 | Jiang ........................ B41J 2/47 |
| | | 372/10 |
| 2016/0019997 A1 * | 1/2016 | Adamchuk ............ C08L 101/04 |
| | | 524/402 |
| 2016/0099088 A1 * | 4/2016 | Adamchuk ............ H01B 3/002 |
| | | 524/544 |
| 2017/0045706 A1 * | 2/2017 | Carberry ................ B41J 3/4073 |
| 2017/0243675 A1 * | 8/2017 | Prange ................ H01B 13/348 |
| 2019/0025534 A1 * | 1/2019 | Carberry ............. G02B 26/121 |

FOREIGN PATENT DOCUMENTS

| | | | | |
|---|---|---|---|---|
| CN | 104361956 A | | 2/2015 | |
| CN | 107849290 A | * | 3/2018 | ............ B41M 5/267 |
| EP | 0329884 A1 | | 8/1989 | |
| EP | 0641821 A1 | * | 3/1995 | |
| EP | 1741749 A1 | | 1/2007 | |
| FR | 2648270 A1 | | 12/1990 | |
| JP | 2013146880 A | | 8/2013 | |
| JP | 2013171657 A | | 9/2013 | |
| JP | 2016175103 A | * | 10/2016 | |
| KR | 100576314 B1 | | 5/2006 | |
| WO | 10011227 A1 | | 1/2010 | |
| WO | WO-2010007938 A1 | * | 1/2010 | ............ H01S 3/067 |
| WO | WO-2010011227 A1 | * | 1/2010 | ............ B23K 26/402 |

OTHER PUBLICATIONS

Lazov et al., (2019). Methodology for Automatic Determination of Contrast of Laser Marking for Different Materials. Environment. Technology. Resources. Proceedings of the International Scientific and Practical Conference (Year: 2019).*

Sabreen, Advancements in Laser Marking of Plastics, Technology Feature, Plastics Decorating, Jan./Feb. 2007, pp. 34-38.

* cited by examiner

HIGH CONTRAST LASER MARKABLE CABLES AND MARKING METHODS

REFERENCE TO RELATED APPLICATION

This application claims the benefit of U.S. Provisional Application No. 63/007,494, filed on Apr. 9, 2020, which is incorporated herein by reference in its entirety.

BACKGROUND

Laser marking methods offer a convenient approach for marking cables with identifying information. Cables can be labeled with identifying information at manufacture or at the point of sale, such that a minimal inventory is required to cover a broad set of products. Laser markings carry the advantage of being particularly resistant to mechanical wear and chemical interference. Thus, in contrast to printed labels and adhesive labels which often can be unintentionally removed or damaged during installation and use, laser markings are embedded within the cable sheathing and relatively durable. Laser energy can be applied to mark the cable in a number of ways. For instance, cable sheathing can be burned away from the cable by ablation. Alternatively, additives can be included in the cable sheathing which absorb laser energy and react to form colored byproducts. Laser marking methods that rely on additives include foaming additives that create a light mark, and charring additives that create a dark mark within the sheathing.

However, implementation of laser marking methods can be limited by certain inefficiencies. For instance, laser marking methods can require a large amount of marking additive and/or extensive exposures to laser energy to produce a mark with sufficient clarity and contrast. Often, the composition of the cable sheathing may provide a barrier to quality laser markings. Polyamide sheathings in particular have proven difficult to yield a high-resolution mark. Moreover, it can be difficult to produce a high contrast mark on cables having a background color that is relatively unsaturated, or relatively similar to the colors generated by the mark. Thus, certain laser marking methods may be effective for cables of some colors and not others. Laser marking methods generic to each color of cable would be advantageous to avoid the need for altering automated marking processes depending on the color of the cable.

Moreover, including large amounts of laser marking additives to accelerate the laser marking methods can have a negative effect on mechanical and electrical properties of the cable sheathing. Moreover, cable sheathing also can comprise any number of further additives, such as color concentrates, stabilizers, and lubricants that can interact with the laser marking additives in unpredictable manner. These effects can be exacerbated where laser marking additives are present in high concentrations. Overloading the laser marking additive also greatly increases the cost of the underlying marked cable, as laser marking additives represent a significant portion of the cost to the final product. Laser marking methods effective on cables having a reduced amount of laser marking additive, while still achieving a mark with sufficient contrast against the color of the cable would provide advantages to cost and cable properties.

Thus, a purpose of this invention is to provide a cable sheathing composition that has a low concentration of laser marking additives, yet is able to generate a high-contrast mark upon exposure to laser energy. It is also a purpose of this invention to provide laser marking methods that are energy efficient, and compatible with conventional cable manufacturing processes. It is also a purpose of this invention to provide laser marking methods that are compatible across a wide range of cable sheathing compositions, colors, and sizes. It is a further purpose of this invention to provide laser marking methods that are robust even in the presence of various additives, such as lubricants, pigments, and fillers.

SUMMARY

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Generally, the present disclosure is directed to cable sheathing compositions, laser markable cables, cable marking methods and apparatus, and cable manufacturing methods and apparatus that make practical advantage of the unexpectedly improved laser marking methods and cables disclosed herein.

Laser markable cable sheathing compositions are contemplated herein, and can comprise an organic polymer and a laser marking additive. The cable sheathing composition can be configured to form an indelible mark upon exposure to an amount of electromagnetic radiation of less than about 10 kJ/cm$^2$. In certain embodiments, the contrast ratio between a color of the indelible mark and a color of an unmarked portion of the cable sheathing composition is at least about 2. Markable cables are also disclosed herein comprising the cable sheathing compositions in any suitable arrangement, such as an outer layer of a multilayer cable sheathing.

Laser marking methods also are disclosed herein, and can comprise focusing a laser source onto a markable portion of a cable sheathing, emitting an electromagnetic radiation from the laser source and onto the markable portion, and forming an indelible mark on the markable portion of the cable sheathing. In certain embodiments, laser marking methods can comprise emitting an amount of the electromagnetic radiation onto the markable portion of less than about 10 kJ/cm$^2$. In certain embodiments, laser marking methods can produce an indelible mark having a contrast ratio between a color of the indelible mark and an unmarked portion of the cable sheathing of at least about 2.

Unexpectedly, the laser marking methods and sheathing compositions disclosed herein can produce a marked cable having excellent contrast ratio and/or resolution in the presence of any number of additives such as lubricants and color concentrates. The laser marking methods and sheathing compositions disclosed herein observed little to no decrease in marking efficiency and contrast ratio in the presence of lubricating additives. Moreover, the laser marks formed on the cable sheathing did not interfere with the action of lubricant additives, nor did the lubricant degrade the quality of the marks.

BRIEF DESCRIPTION OF THE FIGURES

The accompanying drawings, which are incorporated in and constitute a part of this disclosure, illustrate various embodiments of the present invention. In the drawings.

DEFINITIONS

Figure 1A:
FIGS. 1A-1J are photographs of laser marked polyamide coupons according to Examples 1-10, respectively.
Figure 1B:
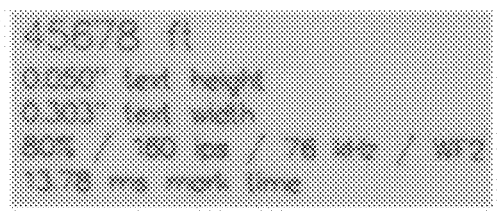
Figure 1C:
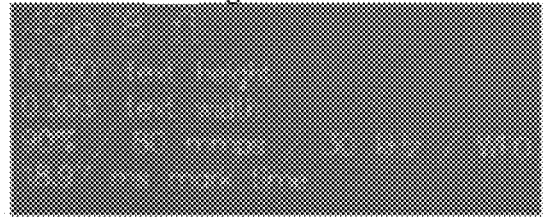
Figure 1D:
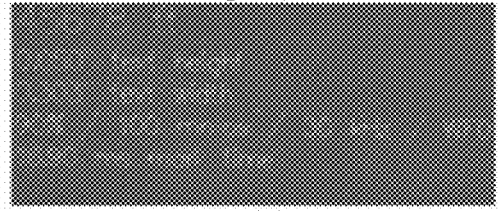
Figure 1E:
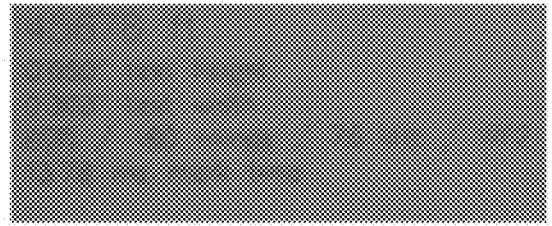
Figure 1F:
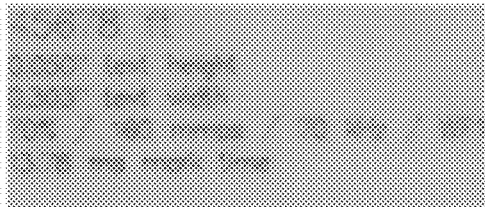
Figure 1G:
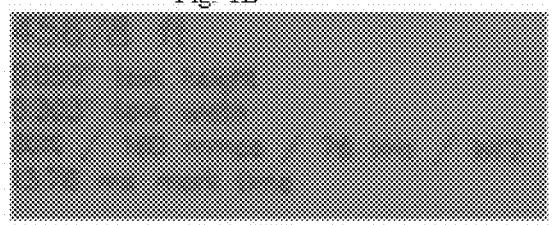
Figure 1H:
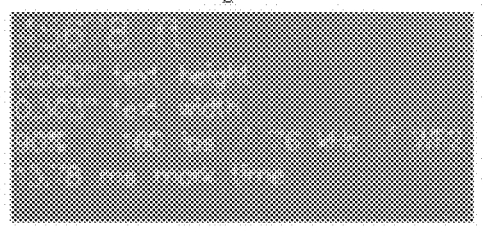
Figure 1I:
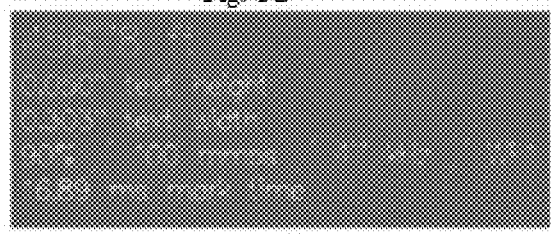
Figure 1J:
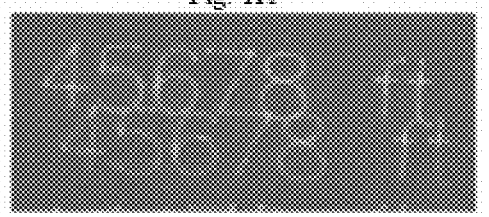
Figure 2A:
FIGS. 2A-2J are photographs of laser marked polyamide coated cables according to Examples 11-20, respectively.
Figure 2B:
Figure 2C:
Figure 2D:
Figure 2E:
Figure 2F:
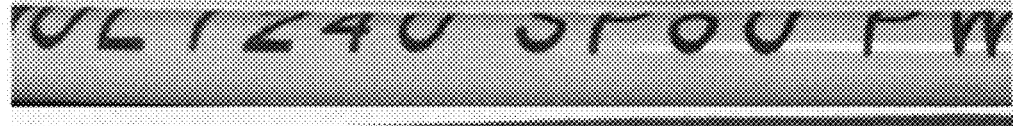
Figure 2G:
Figure 2H:
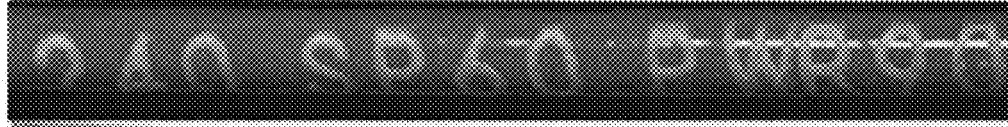
Figure 2I:
Figure 2J:

To define more clearly the terms used herein, the following definitions are provided. Unless otherwise indicated, the following definitions are applicable to this disclosure. To the extent that any definition or usage provided by any document incorporated herein by reference conflicts with the definition or usage provided herein, the definition or usage provided herein controls.

The terms "a," "an," and "the" are intended to include plural alternatives, e.g., at least one, unless otherwise specified. For instance, the disclosure of "a laser marking additive" is meant to encompass one, or combinations of more than one, laser marking additive, unless otherwise specified.

For the purpose of this disclosure, the qualitative color identifiers red, blue, green, pink, purple, orange, yellow, black, white, and grey may be considered as defining ranges of RGB codes, which together encompass every possible RGB code in the color space, without overlap. Additional qualitative names may also describe subsets of these colors. For instance "tan" and "brown" may be considered as representing a subset of orange RGB codes having lighter or darker shades, respectively.

Any or all of the colors described herein can be further characterized as being light or dark (e.g., light blue or dark blue) as would be understood by a person of ordinary skill in the art. For instance, cables can have nominal background colors defined according to industry standards, and thus cable sheathing compositions disclosed herein can be red, blue, brown, orange, and yellow conductors according to their intended use in phased power transmission cables.

Alternatively, colors can be quantitatively defined by an RGB value, or a range of RGB values. For instance, a black cable can be represented by an RGB value of (10, 10, 10), or by a specific range of RGB values spanning (0-40, 0-40, 0-40). Similarly, a white cable can be represented by an RGB value of (240, 240, 240), or by the range of RGB values spanning (220-255, 220-255, 220-255).

Moreover, ranges of RGB values may be defined as the sum of the differentiation of RGB values from a given RGB code. For instance, a novel color "Sweet Rose" can be defined as represented by a singular RGB code (200, 95, 125), and by a range of RGB codes having a RGB value differentiation from (200, 95, 125) of less than 50, less than 40, less than 35, less than 30, less than 25, less than 20, less than 15, less than 10, or less than 5. As defined herein, RGB value differentiation from a given RGB code represents a total deviation from a central RGB code considering a sum of the individual differences in the R value, G value, and B value of the given RGB code. Only the magnitude (absolute value) of the difference in the R, G, and B values is considered, such that moving the R value down does not offset moving the G or B value in the opposite direction. Thus, as defined herein, RGB code (197, 100, 127) would have an RGB value differentiation from "Sweet Rose" of (|−3|+|5|+|2|), or 10. Similarly, RGB code (210, 85, 115) would have an RGB value differentiation of (|10|+|−10|+|−10|), or 30. Accordingly, colors having an RGB differentiation from "Sweet Rose" of less than 10 can include RGB codes (190-210, 95, 125), (200, 85-105, 125), (200, 95, 115-135), (197, 98, 129), (199, 94, 124), etc.

DETAILED DESCRIPTION

The following detailed description provides embodiments and examples of cable marking methods using laser energy, cable sheathing compositions, articles prepared therefrom (e.g., laser markable cables) and cable marking methods and apparatus. This description is not intended to identify required or essential features of the claimed subject matter. Nor is this description intended to be used to limit the scope of the claimed subject matter.

Cable Sheathing Compositions

Cable sheathing compositions disclosed herein are not limited to any particular combination of elements, and generally can be any composition capable of, or configured to be marked by a limited exposure to electromagnetic radiation, (e.g., laser energy). Broadly, cable sheathing compositions disclosed herein can comprise an organic polymer base and a laser marking additive. Cable sheathing compositions also can comprise any number of additional additives that independently may be useful or desirable for the cable sheathing composition. For instance, a cable sheathing composition as exemplified herein can comprise color concentrates, mineral reinforcing agents, fillers, flame retardants, blowing agents, ultraviolet resistant reagents, thermal stabilizers, pigments, antioxidants, fillers, etc., as they may be independently advantageous to the cable sheathing composition, as one of ordinary in the skill in the art would readily understand.

Cable sheathing compositions described herein have demonstrated an unexpected laser marking efficiency, even in the presence of a lubricating additive. In certain embodiments, the lubricating additive can be a self-lubricating additive such as those included as part of SIMpull® cables, described in U.S. Pat. Nos. 8,701,277, 7,557,301, 9,431,152, 9,142,236, 8,616,918, 8,382,518, 8,043,119, 8,986,586, 9,079,745, 9,867,300, 9,796,494, 9,145,219, 8,936,153, 8,788,221, 9,828,209, 9,617,112, 9,864,381, 9,780,542, 8,800,967, and 9,403,659. In certain embodiments, self-lubricating additives can slowly excrete from the cable sheathing composition to ensure the surface of the cable remains lubricated without need for application or reapplication of a lubricant, for instance, prior to cable installation.

Suitable lubricating additives can include a fatty acid, a fatty amide, a hydrocarbon oil, a fluorinated organic resin, a plasticizer, or any combination thereof. In certain embodiments, the lubricating additive can comprise erucamide, oleamide, oleyl palmitamide, stearyl stearamide, stearamide, behenamide, ethylene bisstearamide, ethylene bisoleamide, stearyl erucamide, erucyl stearamide, or any combination thereof. Alternatively, the lubricating additive can comprise a mineral oil, a silicone oil, or both. In other embodiments, the lubricating additive can comprises a tetrafluoroethylene polymer, a vinylidene fluoride polymer, a chlorotrifluoroethylene polymer, or any combination thereof.

The amount of the lubricating additive is not limited to any particular amount, and generally can be any amount advantageous to the lubrication of the cable, without interfering with other properties of the sheathing composition. For instance, the amount of lubricating additive in the cable sheathing composition can be at least 0.1 wt. %, at least 0.4 wt. %, at least 0.8 wt. %, at least 1 wt. % at least 2 wt. %, or at least 5 wt. % of the cable sheathing composition. Alternatively, the amount of lubricating additive may be in a range from about 0.1 wt. % to about 10 wt. %, from about 0.5 wt. % to about 5 wt. %, or from about 1 wt. % to about 3 wt. %.

The organic polymer of the cable sheathing composition is not limited to any particular polymer, as long as it is suitable for an intended purpose relevant to the underlying cable structure (e.g., insulation, shielding, mechanical protection, etc.). The organic polymer also can be compatible with formulations comprising any number of additives useful to the function and characteristics of the cable sheathing. In certain embodiments, the organic polymer can comprise a thermoplastic polymer, a thermoset polymer, or a combination thereof. In other embodiments, the organic polymer can comprise a polyolefin, a polyester, a polycarbonate, a polyamide, a polyether ketone, a polyetherimide, a polyarylene ketone, a liquid crystal polymer, a polyarylene sulfide, a polyacetal, a polyurethane, a polycarbonate, a styrenic polymer, or any combinations thereof.

In certain embodiments, the organic polymer can comprise, consist essentially of, or consist of a polyamide. In other embodiments, the organic polymer can comprise a cross-linked polyethylene. The organic polymer may also make up a majority of the cable sheathing composition, and be primarily responsible for functional characteristics of the sheathing such as electrical insulation and resistance to mechanical damage. In certain embodiments, the cable sheathing therefore can comprise an amount of the organic polymer of at least about 30 wt. %, at least about 40 wt. %, at least about 50 wt. %, at least about 60 wt. %, at least about 75 wt. %, or at least about 90 wt. %. Thus, the cable sheathing can comprise an organic polymer consisting of polyamide in an amount of at least about 50 wt. %, at least about 75 wt. %, or at least about 90 wt. %.

In certain embodiments, the organic polymer can be transparent, colorless, or both. Thus, the cable sheathing compositions disclosed herein may further comprise color concentrates to impart color to the cable sheathing compositions. Color concentrates suitable for the cable sheathing compositions disclosed herein are not limited to any particular color concentrate or pigment, and generally can be any that provide a desired color in the cable sheathing.

Of course, the cable sheathing compositions disclosed herein also can comprise laser marking additives capable of absorbing laser energy and ultimately forming an indelible mark within the cable. Generally, suitable laser marking additives can be selected based on their ability to absorb a particular wavelength of laser energy, and by the manner in which they react to the laser energy.

For instance, the cable sheathing composition can comprise a foaming laser marking additives having a chemical structure configured to decompose into gaseous products upon exposure to laser energy thereby expanding within the cable sheathing composition and creating a light colored mark. Alternatively, or additionally, the cable sheathing composition can comprise a charring laser marking additive that produces charred products upon absorption of the laser energy. Without being bound by theory, charred products may result from the decomposition of the charring additive upon exposure to laser energy. Alternatively, the charring additive may absorb laser energy without decomposition, and cause the immediately surrounding area to heat dramatically and char cable sheathing components within the irradiated region. Charring any of the cable sheathing components results in a dark, or blackened mark against the unmarked region of the cable sheathing composition.

Combinations of charring and foaming additives are also contemplated herein, particularly where the additives may allow for absorption of laser energy at different wavelengths, and thereby independently activate the laser marking additives to form either light or dark contrasted marks within the same article, and by the same marking procedure (e.g., where a light colored mark is formed with a dark outline to enhance contrast and readability). Additives suitable for the cable sheathing compositions described herein can include Iriotec® 8208, Iriotec® 8850, Iriotec® 8825, Fabulase® 361, LaserSafe® 040, or any combination thereof.

Laser marking additives can represent a significant amount of the overall cost of the cable sheathing compositions contemplated herein. However, low concentrations of laser marking additives can provide inadequate marking results, or require large amounts of laser energy to achieve a desirable mark. Thus, identifying a cable sheathing composition having a minimal necessary amount of laser marking additive to achieve an acceptable contrast ratio can provide an advantage to cable sheathing compositions and reduce the overall manufacturing costs of resulting laser markable cables, laser marking methods, and ultimately laser marked cables.

In certain embodiments, an amount of laser marking additive present in the cable sheathing composition can be less than about 10 wt. %, less than about 5 wt. %, less than about 4 wt. %, less than about 3 wt. %, less than about 2 wt. %, less than about 1.5 wt. %, less than about 1 wt. %, less than about 0.8 wt. %, less than about 0.6 wt. %, less than about 0.5 wt. %, less than about 0.4, wt. %, less than about 0.3 wt. %, less than about 0.2 wt. %, or less than about 0.1 wt. %. Alternatively, an amount of the laser marking additive can be in a range from about 0.01 wt. % to about 10 wt. %, from about 0.01 wt. %, to about 5 wt. %, from about 0.01 wt. %, to about 2 wt. %, from about 0.1 wt. %, to about 2 wt. %, from about 0.05 wt. % to about 1 wt. %, from about 0.1 wt. % to about 1 wt. %, from about 0.1 wt. % to about 0.8 wt. %, or from about 0.1 wt. % to about 0.5 wt. %.

Selection of color concentrates and an unmarked, background color for the cable sheathing compositions is also contemplated herein. Color concentrates are widely used in cable sheathing compositions to provide an enormous variety of standardized cable colors. While the cable compositions disclosed herein are not limited to any particular set of color concentrates, a person of ordinary skill in the art will understand that certain color concentrates and combinations thereof may provide better contrast and quality of marks in combination with laser marking additives than cable sheathing compositions comprising other color concentrate combinations. Additionally, the chemical composition and structure of the color concentrates varies from color concentrate to color concentrate, and can often interact with other additives in an unpredictable manner. Particularly relevant to this disclosure, certain color concentrates may interfere with the absorption of laser energy by the laser marking additives, and their decomposition, ultimately degrading the quality of the resulting mark.

Moreover, laser marking compositions comprising certain combinations of color concentrate pigment and laser marking additives can be particularly difficult to mark with an acceptable contrast ratio, depending on the nature of the laser marking additive and the color concentrate pigments. An essentially unlimited number of combinations of color concentrates and laser marking additives can be described, each having unpredictable results that stem from the nature of their chemical structures, physical properties, energy absorption profiles, to name a few. Thus, for any desired background color, there may be no predictable manner in which a compatible combination of laser marking additive and color concentrate can be determined and efficiently produce a laser mark of sufficient contrast. This is especially true where the background color of the unmarked cable sheathing is a relatively unsaturated hue, such as light grey, light blue, pink (light red), light purple, or tan.

Still, a need exists for cable sheathing across a wide range of background colors. Surprisingly, cable sheathing compositions disclosed herein generally can be any color while retaining an excellent contrast ratio between marked and unmarked regions, due to the paired laser marking compound and refined laser marking methods described in detail below. In certain embodiments, cable sheathing compositions disclosed herein can be described nominally as being black, white, gray, red, blue, orange, yellow, purple, or brown. Finer distinctions may be drawn to describe shades and hues of colors described above, such as tan as distinguished from brown, or pink as distinguished from red.

In certain embodiments, the cable sheathing compositions of the invention can comprise a color concentrate or combination of color concentrates that results in any background color disclosed herein. For instance, Examples provided herein consider cable sheathing compositions comprising laser marking additives and having background colors nominally of black, white, gray, red, pink, blue, purple, green, orange, yellow, brown, and tan. The associated hex codes were determined by image analysis software, as shown by Tables 1, 3, and 5, within the Examples section herein. Thus, cable sheathing compositions disclosed herein can have a background color selected from any of the RGB values represented by Examples 1-32.

Moreover, cable sheathing compositions contemplated herein can have a background color represented by any of a range of RGB values encompassed by Examples 1-32, and any RGB codes having a total RGB value differentiation from Examples 1-32 of less than 200, less than 150, less than 100, less than 75, less than 50, less than 40, less than 35, less than 30, less than 25, less than 20, less than 15, less than 10, or less than 5.

In certain embodiments, cable sheathing compositions disclosed herein can comprise a dark background color. For instance, cable sheathing compositions can have a black background color nominally, or alternatively described as having an RGB value of RGB(15,13,7) or any RGB value having an RGB differentiation therefrom as mentioned above. Alternatively, the background color of the cable sheathing composition can be red nominally, and have an RGB value of RGB(130,26,10), or any RGB value having an RGB differentiation therefrom of less than 30. Alternatively, the background color of the cable sheathing composition can be blue nominally, and have an RGB value of RGB(46,65,96) or any RGB value having an RGB differentiation therefrom of less than 30. Alternatively, the background color of the cable sheathing composition can be gray nominally, and have an RGB value of RGB(89,86,75) or any RGB value having an RGB differentiation therefrom of less than 30. Alternatively, the background color of the cable sheathing composition can be purple nominally, and have an RGB value of RGB(95,59,92) or any RGB value having an RGB differentiation therefrom of less than 30. Alternatively, the background color of the cable sheathing composition can be brown nominally, and have an RGB value of RGB(145,84,29) or any RGB value having an RGB differentiation therefrom of less than 30.

In those embodiments where the cable sheathing compositions comprise a dark background color, including each of those listed above, the laser marking additive may advantageously comprise a foaming additive to produce a highly contrasted light-colored indelible mark by exposure to electromagnetic radiation. In certain embodiments, and when paired with certain efficient laser marking methods as described below, these cable sheathing compositions can be considered to be configured to produce an indelible mark having a contrast ratio between a color of the indelible mark and a color of an unmarked portion of the cable (e.g., the background color) of at least 1.5, at least 1.6, at least 1.7, at least 1.8, at least 1.9, at least 2, at least 2.1, at least 2.2, at least 2.3, at least 2.4, at least 2.5, at least 3, at least 4, at least 5, at least 6, or at least 7.

Alternatively, cable sheathing compositions disclosed herein can comprise a light background color. For instance, cable sheathing compositions can have a white background color nominally, or alternatively described as having an RGB value of RGB(177,166,139) or any RGB value having an RGB differentiation therefrom of less than 30. Alternatively, the background color of the cable sheathing composition can be orange nominally, and have an RGB value of RGB differentiation therefrom of less than 30. Alternatively, the background color of the cable sheathing composition can be yellow nominally, and have an RGB value of RGB(158,148,58) or any RGB value having an RGB differentiation therefrom of less than 30. Alternatively, the background color of the cable sheathing composition can be green nominally, and have an RGB(19,112,42) or any RGB value having an RGB differentiation therefrom of less than 30. Alternatively, the background color of the cable sheathing composition can be pink nominally, and have an RGB(176, 122,100) or any RGB value having an RGB differentiation therefrom of less than 30. Alternatively, the background color of the cable sheathing composition can be tan nominally, and have an RGB value of RGB(176,135,93) or any RGB value having an RGB differentiation therefrom of less than 30.

In certain embodiments, cable sheathing compositions comprising a light background color, including each of those listed above, may advantageously comprise a charring additive to produce a highly contrasted dark-colored indelible mark by exposure to electromagnetic radiation. In certain embodiments, and when paired with certain efficient laser marking methods as described below, these cable sheathing compositions can be considered as being capable of, or configured to produce an indelible mark having a contrast ratio relative to an unmarked portion of the cable of at least 1.5, at least 1.6, at least 1.7, at least 1.8, at least 1.9, at least 2, at least 2.1, at least 2.2, at least 2.3, at least 2.4, at least 2.5, at least 3, at least 4, at least 5, at least 6, or at least 7.

Cable sheathing compositions disclosed herein, and comprising the aforementioned elements, and as shown by Examples 1-32 below, can be capable of, or configured to being laser marked with high contrast marks (e.g., a contrast ratio of at least about 2) by exposure to an amount of electromagnetic radiation. In certain aspects, the amount of electromagnetic radiation needed to form a high contrast mark can be in a range from about 0.01 $kJ/cm^2$ to about 10 $kJ/cm^2$, from about 0.01 $kJ/m^2$ to about 5 $kJ/m^2$, from about 0.01 $kJ/m^2$ to about 2 $kJ/m^2$, from about 0.01 $kJ/m^2$ to about 1 $kJ/m^2$, from about 0.01 $kJ/cm^2$ to about 0.5 $kJ/cm^2$, or from about 0.01 $kJ/cm^2$ to about 0.1 $kJ/cm^2$. In other aspects, the amount of electromagnetic radiation can be less than about 10 $kJ/cm^2$, less than about 5 $kJ/cm^2$, less than about 2 $kJ/cm^2$, less than about 1 $kJ/cm^2$, less than about 0.5 $kJ/cm^2$, less than about 0.1 $kJ/cm^2$, less than about 0.05 $kJ/cm^2$, or less than about 0.01 $kJ/cm^2$.

Laser Markable Cables

Generally, the laser markable cables contemplated herein are not limited to any particular type or class of cable, and can comprise power cables, signal cables, ground cables, coaxial cables, fiber optic cables, or any cable that can be suitable for a particular cabling application. Accordingly, the laser markable cables contemplated herein can comprise any arrangement of internal components suitable for their intended purpose. For instance, laser markable cables contemplated herein can comprise a plurality of conductors, an electrical shielding layer, a filler, and a ground conductor within an external laser markable sheathing layer. In certain embodiments, the laser markable cable can be an overhead power cable. Alternatively, the laser markable cable can comprise a THHN, XHHW, or THWN conductor.

Laser markable cables contemplated herein broadly can include cables that may be capable of, or configured to provide an indelible, high contrast laser marking upon limited exposure to electromagnetic radiation from a laser source. Generally, such an ability to provide a high contrast mark can be achieved by the inclusion of a markable sheathing layer comprising a cable sheathing composition as described in detail above. The dimensions and disposition of the markable sheathing layer within the cable is not limited to any particular arrangement, and can be any that are generally suitable for relevant cable constructions and laser marking methods.

Although the application of the sheathing compositions and marking methods described herein is not limited to any particular diameter of laser markable cable, larger diameter cables may require a thicker cable sheathing, and therefore a larger amount of cable sheathing composition. Such embodiments may benefit from having a markable cable sheathing composition disposed as a thin outer sheathing around a conventional cable sheathing layer. In this manner, the laser marking additive would only be present in the sheathing where it may absorb laser energy in the area intended to be marked. Thus, in certain embodiments, the markable sheathing layer can be an outer sheathing layer of a cable. The markable sheathing layer may completely encircle the cable, or be combined with a conventional cable sheathing and thus represent only a portion of the outer cable sheathing layer. For instance, the markable sheathing layer can be a stripe disposed within a conventional outer sheathing layer. Such an arrangement can be advantageous to limit the use of marking additives as described above, which often can be the primary driver of expense in laser markable cables. The markable sheathing layer is therefore not limited by any combination of shapes to achieve a particular marking pattern or implementation.

Similarly, the markable sheathing layer is not limited to any particular depth, width, or length, and in some aspects can be dependent on the intended marking patterns, dimensions of the cable, or cost limitations for the material. In certain aspects, the markable sheathing layer can be an outer layer having a depth of less than about 100 mm, less than about 50 mm, less than about 20 mm, less than about 10 mm, less than about 5 mm, less than about 2 mm, less than about 1 mm, less than about 0.5 mm, less than about 0.1 mm. In certain aspects, the markable sheathing layer can represent the entire cable sheathing. Alternatively, the markable sheathing layer can comprise only a portion of the cable sheathing.

Additionally, or alternatively, the cable can comprise additional components or layers on the exterior of the markable sheathing layer, provided that the additional components do not interfere with the laser marking process. For instance, SIMpull® cables can comprise a lubricating additive that continually exudes from the exterior sheathing of the cable. Similarly, laser markable cables disclosed herein can comprise a markable sheathing layer, and one or more lubricating additives disposed on the outer surface of the markable sheathing layer.

Further, the markable sheathing layer can be an inner layer of the cable sheathing, disposed within a conventional outer sheathing layer. In such embodiments, the outer layer of the cable can be transparent with respect to visible light and to the electromagnetic radiation of the laser marking process. In this manner, laser energy can largely pass through the conventional outer sheathing to form the indelible mark on the markable sheathing layer, and the indelible mark also can be seen through the transparent outer layer.

Certain embodiments may comprise one or more markable sheathing layers as a longitudinal stripe or band along the length of the cable, to further reduce the amount of laser marking additive needed to achieve the desired mark. In such embodiments, the markable sheathing layer would not need to extend throughout the width of the sheathing layer, nor the entire circumference of the sheathing layer. In this manner, the laser markable cable can comprise a plurality of markable sheathing layers, wherein each of the markable sheathing layers can be configured to be marked independently (e.g., via application of different wavelengths of laser energy). In such embodiments, the cable can comprise a first markable sheathing layer as a first longitudinal portion comprising a first laser marking additive, and a second markable sheathing layer as a second longitudinal portion comprising a second laser marking additive.

The markable sheathing layer may also be disposed within additional sealing, and sheathing layers, in order to further preserve the indelible marks and the markable capacity of the cable. For instance, a transparent sealing polymer may be disposed over the surface of the markable sheathing layer to entrap the foamed or charred compounds after creation of the marked cable by exposure to laser energy. Cables manufactured in this manner can be suitable to create the indelible and contrasted marks described herein under certain marking conditions.

Laser Marking Methods and Apparatus

Laser marking methods relevant to cable sheathing and markable cables are contemplated herein. In certain embodiments, laser marking methods disclosed herein can comprise focusing a laser source onto a markable portion of a cable sheathing, emitting an electromagnetic radiation from the laser source and onto the markable portion, and forming an indelible mark on the markable portion of the cable sheathing.

In certain embodiments, laser marking methods are described as being applicable to marking cables (e.g. power cables) of all shapes and sizes. Thus, cable marking apparatus configured to implement the laser marking methods within conventional cable manufacturing processes are also contemplated herein. Generally, such apparatus can comprise a controller configured to receive input from the cable manufacturing process and apply it to a laser source such that the desired marking can be achieved without interruption to the conventional manufacturing processes. Controllers may be used to control the cable line speed and precisely position a markable portion of the cable within the stationary marking field of the laser source, while also controlling aspects of the laser source and the laser energy emitted therefrom. In this manner, controllers can process information from cable manufacturing equipment as inputs to the laser marking methods contemplated herein. Cable marking apparatus disclosed herein can comprise a laser source integrated within a conventional cable manufacturing process by a controller.

Cables are typically manufactured along a line, such that the cable can be continually produced via stationary equipment. Generally, cables can be advanced from one piece of equipment to another in series, until the manufacturing process is complete. As the cable moves through the manufacturing along its longitudinal axis, cable marking apparatus are contemplated herein that provide laser sources at fixed positions along the cable manufacturing line, and configured to laser mark a cable as it advances along its longitudinal axis.

Cable manufacturing processes can operate at line speeds of about 100 linear ft/min or more, often significantly more. Conventional laser marking methods have required much slower line speeds to account for the speed of marking. However, laser marking methods contemplated herein are shown to effectively mark the cables without slowing the manufacturing line speed. Moreover, laser marking methods described herein also do not require excess laser marking additive to the cable sheathing in order to achieve excellent line speeds. In certain embodiments, the laser marking methods are capable of achieving line speeds of at least about 50 ft/min, at least about 100 ft/min, at least about 200 ft/min, at least about 250 ft/min, at least about 400 ft/min, at least about 500 ft/min, at least about 1000 ft/min, or at least about 2000 ft/min. Alternatively, line speeds can be in a range from about 500 ft/min to about 5,000 ft/min, from about 1,000 ft/mmin to about 5,000 ft/min, from about 1,000 ft/min to about 2,500 ft/min, or from about 500 ft/min to about 2,500 ft/min.

These line speeds can be achieved even where the article being marked is marked to a high degree. In certain embodiments, laser marking methods herein can maintain the line speeds disclosed above, even where the percentage of the cable surface being marked is greater than about 1%, greater than about 3%, greater than about 5%, greater than about 10%, greater than about 20%, or greater than about 40%. The percentage of marked cable can correlate to a continuous sequence of characters printed on the cable, and or an amount of characters per linear foot of the produced cable, and maintain any line speed noted above. For instance, in certain embodiments, laser marking processes disclosed herein can mark the surface of the cable with at least 5 characters per linear foot, at least 10 characters per linear foot, at least 20 characters per linear foot, at least 50 characters per linear foot, or at least 100 characters per linear foot. It will be understood by persons of ordinary skill these marking amounts can be achieved by the laser marking processes disclosed herein, for instance, by employing a single laser source operating at any of the line speeds disclosed above.

Efficiency in laser marking may also be achieved by use of a plurality of laser sources within the cable marking apparatus. For instance, additional laser sources can further increase line speeds, and alleviate the dependence between ultimate manufacturing line speeds on the laser marking efficiency as a rate limiting factor. In certain embodiments, multiple laser sources can be arranged in series along the longitudinal dimension of the cable in the cable marking apparatus. The controller can thereby coordinate laser marking methods such that each laser source serially contributes to a portion of the marking required for the complete marking design.

Alternatively, or additionally, a plurality of laser sources can be arranged axially about the circumference of the cable in an axial orientation. In this manner, it can be ensured that the laser marking methods are not applicable to only to a particular portion of the circumference of a cable during the cable manufacturing process. Instead, axial laser sources arranged around the cable facilitate laser marking any markable portion of the cable about the cable circumference. Such an arrangement may also be advantageous by reducing the marking field size for any particular laser source. It is contemplated herein that a smaller marking field may be less prone to deviations in marking efficiency due to variations in the distance of the cable surface to the laser source. In certain embodiments, any laser source can be positioned substantially orthogonal to the cable surface, such that the incident angle of the emitted laser energy is about 90°.

Given the descriptions of cable marking apparatus above, it will be apparent that focusing the laser source on a markable portion of a cable sheathing can comprise any of the related steps disclosed above. Specifically, focusing the laser source on a particular unmarked portion of a cable is contemplated, and can comprise advancing the cable through the marking field of a stationary laser source, at a set distance from the laser source. Focusing the laser source can further comprise adjusting the position and/or size of the marking field of the laser source to accommodate a specific marking design or pattern, or a specific portion of a design or pattern. As disclosed above, these modifications can be determined and applied by the controller within a cable marking apparatus.

Laser sources suitable for laser marking methods disclosed herein are not limited to any particular laser source, and may be any that are capable of emitting a laser energy and forming an indelible mark on a cable sheathing as described. Many laser sources are known as generally suitable for laser marking cables. For instance, the laser source can comprise a solid state laser, a gas laser, a chemical laser, a color concentrate laser, a metal-vapor laser, a semiconductor laser, and any combination thereof. The laser source therefore can comprise a Yb:fiber laser, a $CO_2$ laser, an Nd:YAG laser, or any combination thereof.

The markable portion of the cable may correspond to a portion of the cable within a marking field of the laser source, or any combination of a plurality of laser sources. Thus, the markable portion of the cable can ultimately relate to the shape and size of the indelible mark formed by the laser energy, as described below. In certain aspects of laser marking methods disclosed herein, the markable portion can overlap with other previously marked portions, as the focus of the laser source is adjusted both within the stationary marking field of the laser source and relative to the cable as it is advanced through the stationary marking field. For instance, a line may be formed by continuously moving the focus of the laser along the length of the line. Thus, the markable portion as the focus of the laser source may overlap to some degree with a previously marked portion of the cable.

Once focused on the markable portion of cable sheathing, the controller may cause the laser source to emit an amount of electromagnetic energy onto the markable portion. Commonly, the laser source will be capable of emitting laser energy having a wavelength within a range from about 180 nm to about 4,000 nm, from about 600 nm to about 2,000 nm, from about 800 nm to about 1,400 nm, or from about 1,000 to about 1,200 nm. In certain embodiments, the laser energy can comprise infrared radiation, visible radiation, ultraviolet radiation or any combination thereof. For instance, Nd:YAG lasers can emit laser energy comprising wavelengths at 1064 nm, and can be well suited for the laser marking methods contemplated herein.

The electromagnetic radiation emitted from the laser source and applied to the markable portion of the cable sheathing may also be characterized by the power of the radiation, which considers both the wavelength of the radiation and its amplitude. In certain embodiments, the laser source can have a maximum power in a range from about 1 W to 100 W, from about 5 W to about 50 W, or from about 20 W to about 40 W.

The electromagnetic radiation may further be characterized by its waveform. Generally, the waveform of the electromagnetic radiation can be any that are suitable to irradiate the markable portion of the cable sheathing and form a mark. For instance, the waveform may be a sinusoidal wave, a triangle wave, a sawtooth wave, a square wave, a ramp wave, a line wave, or an exponential wave (rise or fall). Moreover, the laser energy can emit the wave as a pulse or continuous wave. Where the emission is pulsed, the frequency can be any suitable to achieve the desired marking. In certain aspects, the frequency can be about 30 kHz, about 60 kHz, or about 76 kHz, or alternatively, in a range from about 1 kHz to about 1000 kHz, from about 20 to about 200 kHz, from about 10 to about 100 kHz, or from about 15 to about 76 kHz.

The electromagnetic radiation emission can also be characterized by its duration for a given point within the markable portion, and typically not the markable portion as a whole since the emission may be continuous as the position of the markable portion is moved according to a design. For instance, the focus of the markable portion can be moved along a linear path to create a series of marked portions forming an evenly marked line. In certain aspects, a total duration of the emitting step can be in a range from about 1 ns to about 1,000 ns, from about 5 ns to about 500 ns, from about 10 ns to about 250 ns, from about 50 ns to about 500 ns, or from about 50 ns to about 250 ns.

The duration may also be determined by, and related to, a scan speed of the laser marking method. The scan speed of a laser marking method refers to the speed at which the laser marking proceeds from one markable portion to the next. In forming a series of individual marks, this scan speed may be interpreted as a number of marks produced in an amount of time. Alternatively, in a continuously marking method, the scan speed can be represented as the speed by which the markable portion advances. Thus the scan speed is inversely related to the duration described above, such that a shorter emitting step will result in faster scan speeds. In certain aspects, the scan speed can be at least about 500 mm/s, at least about 1000 mm/s, at least about 1500 mm/s, at least about 2000 mm/s, at least about 2500 mm/s, at least about 4000 mm/s, or at least about 5000 mm/s. Alternatively, certain embodiments can have a scan speed of at least about in a range from about 400 mm/s to about 10,000 mm/s, from about 800 mm/s to about 6,000 mm/s, from about 1,000 mm/s to about 5,000 mm/s, from about 1,000 mm/s to about 4,000 mm/s, or from about 1,000 mm/s to about 3,000 mm/s.

Further, the efficiency of the marking process can be summarized by a total amount of energy emitted to sufficiently mark a markable portion of a given size. This measure of energy applied to a given portion of the cable sheathing can be referred to as the energy density, or dose, and can be calculated as the product of the power, the inverse of the scan speed, and the inverse of the laser mark spot size area. In certain embodiments, a sufficient contrast ratio can be achieved with an energy density of less than about 1 $kJ/cm^2$, less than about 500 $kJ/cm^2$, less than about 400 $kJ/cm^2$, less than about 300 $kJ/cm^2$, less than about 250 $kJ/cm^2$, less than about 200 $kJ/cm^2$, less than about 100 $kJ/cm^2$, less than about 50 $kJ/cm^2$, less than about 10 $kJ/cm^2$, less than about 5 $kJ/cm^2$, less than about 1 $kJ/cm^2$, less than about 0.5 $kJ/cm^2$, less than about 0.1 $kJ/cm^2$, less than about 0.01 $kJ/cm^2$, or less than about 0.001 $kJ/cm^2$. In other aspects, the energy density to achieve a sufficient contrast ratio can be in a range from about 0.01 $kJ/cm^2$ to about 100 $kJ/cm^2$, from about 0.1 $kJ/cm^2$ to about 50 $kJ/cm^2$, from about 0.1 $kJ/cm^2$ to about 20 $kJ/cm^2$, or from about 1 $kJ/cm^2$ to about 20 $kJ/cm^2$.

As mentioned above, laser marking methods that continuously move the position of the markable portion along a linear path can result in a line pattern. Using a line as a fundamental unit of designs allows any pattern to be printed as a two-dimensional mark on the cable. Lettering can be marked on the cable sheathing by imprinting an appropriate series of lines on the cable. Similarly, graphics can be marked on the cable. A minimum width of the line can be determined by and related to the size of the markable portion. However, greater line widths can be achieved by patterns that align a plurality of lines adjacent to one another.

In such embodiments, it was observed that the order of marking with respect to the inner and outer lines within a mark can be advantageously arranged to maximize the contrast of the mark. For instance, where foaming marking additives are used, it can be advantageous to first form a central inner line, and form additional adjacent lines successively from the center line. Additionally, it can be advantageous to overlap the marked lines to enable color concentrates to be pushed away from the center of the marked portion and toward the edge of the marked portion with each pass. In this manner, the amount of residual color concentrate remaining within the marked portion can be minimized. This can have the effect of producing a lighter marked region, and also a darker outline region of the markable portion, as the color concentrates become concentrated at the edge of the design.

Articles produced by these marking methods may advantageously comprise an indelible mark, and/or a series of indelible marks arranged in any fashion or design (e.g., overlapping, linear, etc.), as described above. In certain aspects, the shape of any individual indelible mark can be a circle, square, rounded square, rectangle, rounded rectangle, oval, triangle, or any other regular or irregular polygon. The size of any individual indelible mark is similarly not limited, and can be any size suitable to create a mark having sufficient contrast, and form the intended design.

Marked articles formed by the methods disclosed herein may have a minimum contrast ratio, as compared to the unmarked article (e.g., the background color of the markable portion prior to the marking step). In certain aspects, the contrast ration can be in a range from about 1.5 to about 5, from about 1.5 to about 3, from about 2 to about 5 from about 2 to about 10, from about 2 to about 4, or from about 1.8 to about 3. The contrast ratio is dependent on both the quality of the laser marking, and the initial background color. Thus, articles having a background color that is more heavily saturated may be able to be marked with sufficient contrast with a lower concentration of color concentrate than for relatively unsaturated hues. Accordingly, the above ranges apply to articles (e.g., cables) having any background color disclosed above, independently. Moreover, independent contrast ratios and background colors can be achieved as combined with any range of color concentrate concentration, and total energy applied during the laser marking methods. In this manner, laser marking methods are contemplated herein, such as are represented by the examples below, where each of the background color, contrast ratio, amount of color concentrate, and total energy of the electromagnetic radiation applied are considered each as being unique and unexpected combination that produces a high contrast mark with an efficient amount of laser energy.

Laser marking methods described herein can be incorporated within any manner of cable manufacturing processes, and applied at any point during a particular manufacturing process processes to provide a cable installer with a marked cable durable to the installation process. In certain aspects, laser marking processes can be applied immediately after the cable sheathing is extruded over the cable core components. Alternatively, laser marking processes disclosed herein can be applied after reeling and storing the cable, as part of just-in-time laser printing processes that conduct laser printing very near the moment the cable is shipped from a storage facility. Such just-in-time laser marking processes can facilitate greater customization of the laser printed text, as well as reduce the storage burden necessary to accommodate several iterations of laser printed cable. For instance, where a cable manufacturer provides a particular type of cable to several customers who each request a custom print on the cable, a single reel of cable can be manufactured and stored, and laser marking methods disclosed herein employed to mark the cable as the cable is ordered by a particular customer.

Laser marking may also be applied at more than one point in a cable manufacturing process. In certain embodiments, the laser marking processes can contemplate marking a cable with both a standardized marking common to each intended customer (e.g., a manufacturer product number, size and load capacity information specific to the cable itself), and a customized marking tailored to the specific customer, or a customer's specific application. In such aspects, the standardized marking can be applied during the manufacturing process, and the customized marking may be applied at or after the point of sale, as the cable is prepared for delivery. For instance, a standardized marking can be applied to a cable after the cable sheathing is extruded onto the cable core, and before the cable is reeled (including any post-processing steps) and shipped for storage. A customized marking can be applied by any laser marking methods disclosed herein at the storage facility as requested by the customer, immediately prior to packaging for delivery.

Laser marking methods disclosed herein can accommodate custom printing needed at job sites and eliminate on-site tagging, for instance where cables can be pre-marked with installation information such as a conduit run assignments, phase information, lengths, circuit numbers, etc. Laser marking methods disclosed herein can be applied to any such pre-marked cable systems, as those that are described in detail within U.S. application Ser. No. 16/536,715, which is incorporated herein by reference in its entirety.

Laser marking methods disclosed herein can be incorporated into barrel-to-barrel marking processes or reel-to-reel marking processes. For instance, where a stock wire barrel is desired to be custom labeled, the wire can be drawn from the barrel, fed through a laser marking apparatus as described herein to mark the cable, and repackaged in a separate barrel. Laser marking can also be applied to reels of wires, and for multiple conductor barrels as described within U.S. Pat. No. 8,936,153.

EXAMPLES

Embodiments of the invention may be further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the embodiments of the invention or the scope of the appended claims.

Examples 1-32 each provide examples of laser marking methods applied to produce laser marked samples of polyamide. In conducting the laser marking, the composition of cable sheathing additives were varied, along with attributes of the laser marking methods. Generally, Examples 1-10 provide a baseline for laser marking SIMpull-style lubricated polyamide cables, having a relatively high amount of laser marking additive at typical laser marking energies and speeds. Examples 11-32 represent improvements over the baseline of Examples 1-10 by reducing the amount of color concentrate in the cable sheathing, identifying optimal laser marking methods, in combination with specific color concentrates resulting in excellent contrast between the resulting mark and the background color of the cable.

Further details of the laser marking methods and color contrast analysis methods are provided below, along with cable sheathing compositions and laser marking results of each example.

Laser Marking Methods

Each of Examples 1-32 were marked according to the following general procedure. An Amada LMF35-HP Yb:fiber pulsed laser was used in all examples, capable of emitting a 35-watt, 1064 nm laser at maximum power (100%). The laser was pulsed intermittently at a rate ranging from 15-76 kHz. Each example was conducted using a 254 mm focus lens and an f75 beam collimator, resulting in a spot size (and line width) calculated to be about 0.24 mm wide. A fume extractor removed toxic fumes produced during the marking procedure.

The cable sheathing samples to be marked were secured within the marking field of the Amada laser, which was dimensioned as a 157 mm×157 mm square. The maximum power (40-90%, as a percentage of 35 W), scan speed (1000 mm/s to 4000 mm/s), pulse frequency (15-76 kHz), and average applied laser power (14-31.5 W) were varied according to parameters listed in each example and shown with each examples in the tables below. From these parameters, an energy density (e.g. dose) applied to create the marks for each example was calculated for each examples to allow straightforward comparisons between the energy applied to produce the laser marks and the resulting quality and contrast of the laser marks.

Evaluation of Laser Marked Samples and Color Contrast Analysis

Figures 3A, 3B, 3C, 3D, 3E, 3F, 3G, 3H, 3I, 3J, 3K, 3L:
FIGS. 3A-3L are photographs of laser marked polyamide coated cables according to Examples 21-32, respectively.
Figure 4A:
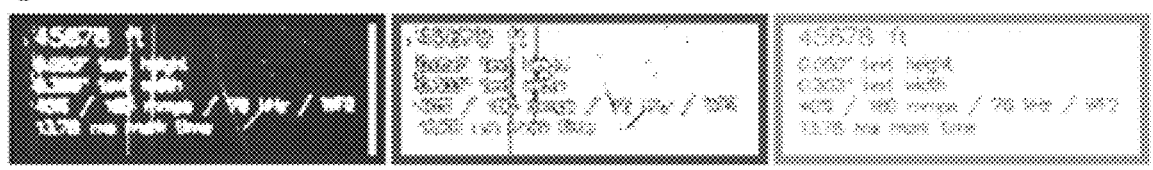
FIGS. 4A-4C shows results from the k-clustering analyses used to calculate contrast ratio of laser marked samples having a nominally black background color (Examples 1, 11, and 21, respectively).
Figure 4B:
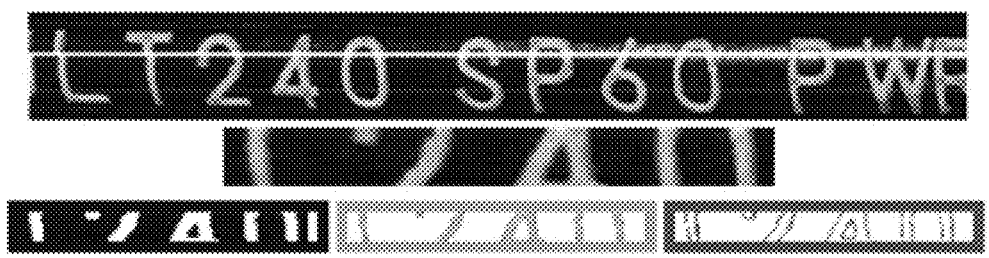
Figure 4C:
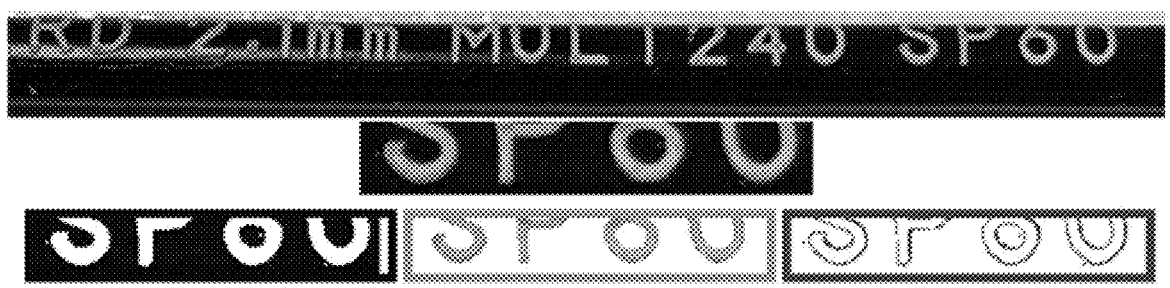
Figure 5A:
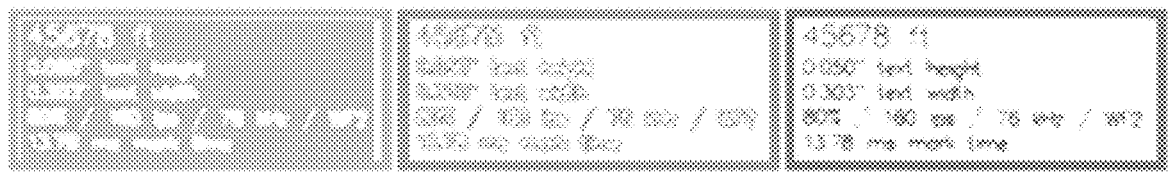
FIGS. 5A-5C shows results from the k-clustering analyses used to calculate contrast ratio of laser marked samples having a nominally white background color (Examples 2, 12, and 22, respectively).
Figure 5B:
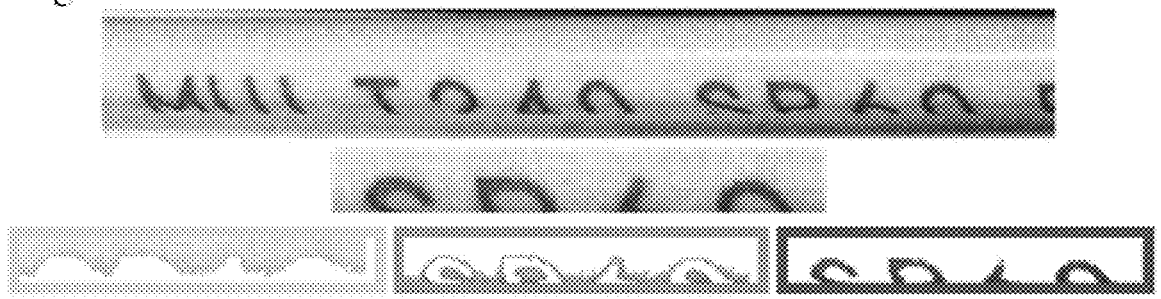
Figure 5C:
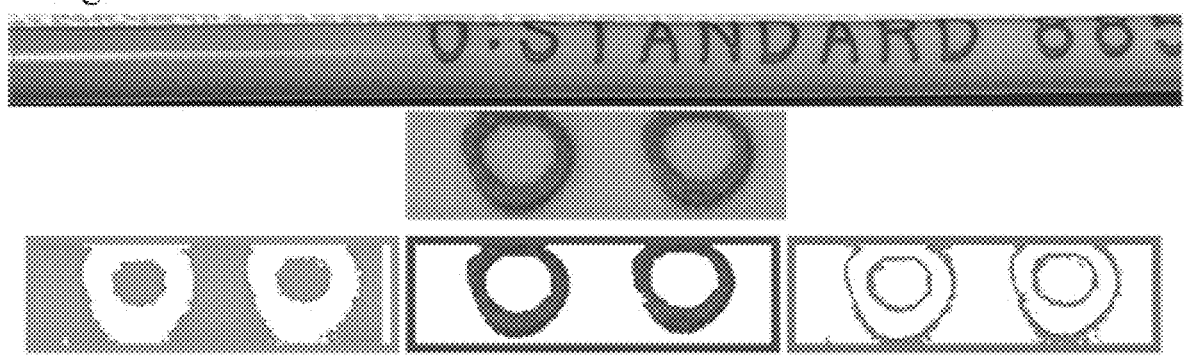
Figure 6A:
FIGS. 6A-6C shows results from the k-clustering analyses used to calculate contrast ratio of laser marked samples having a nominally red background color (Examples 3, 13, and 23, respectively).
Figure 6B:
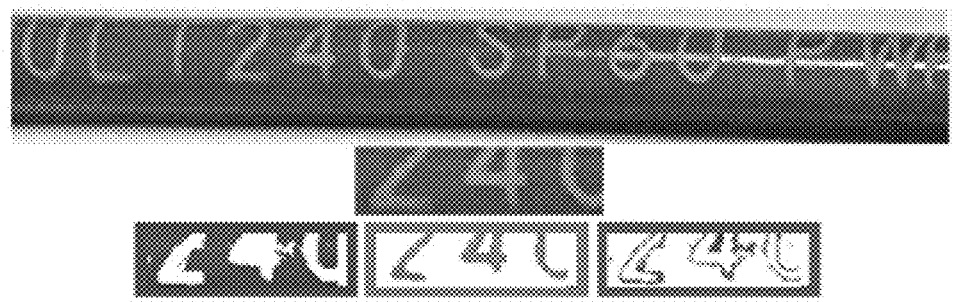
Figure 6C:
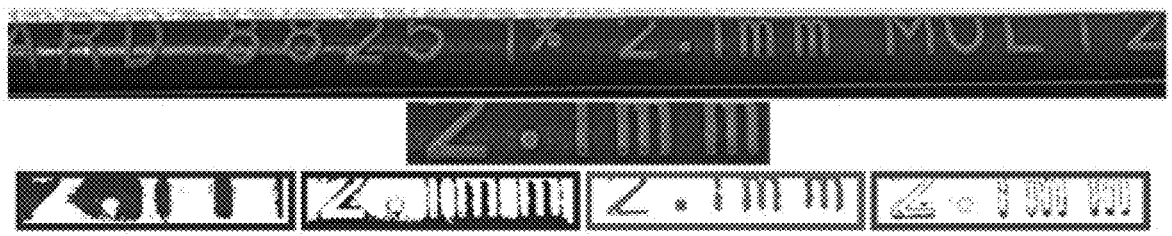
Figure 7A:
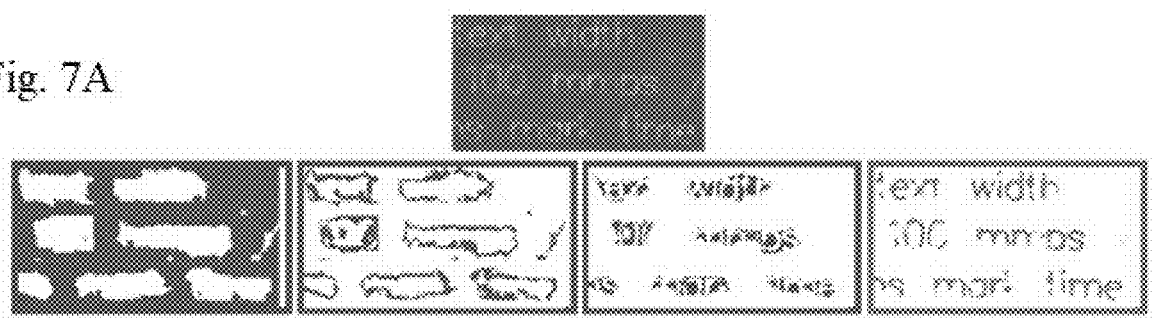
FIGS. 7A-7C shows results from the k-clustering analyses used to calculate contrast ratio of laser marked samples having a nominally blue background color (Examples 4, 14, and 24, respectively).
Figure 7B:
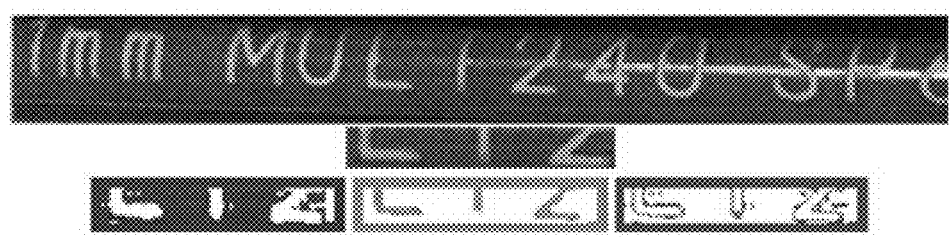
Figure 7C:
Figure 8A:
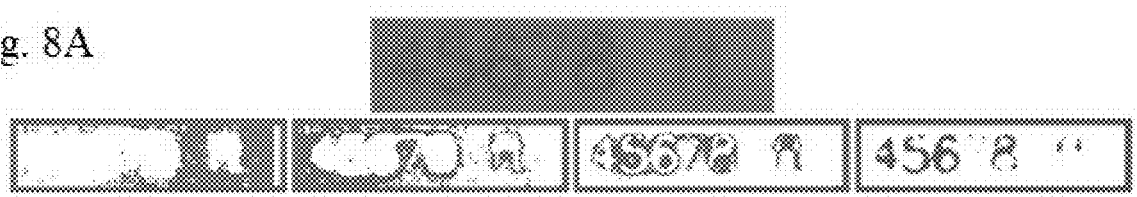
FIGS. 8A-8C shows results from the k-clustering analyses used to calculate contrast ratio of laser marked samples having a nominally orange background color (Examples 5, 15, and 25, respectively).
Figure 8B:
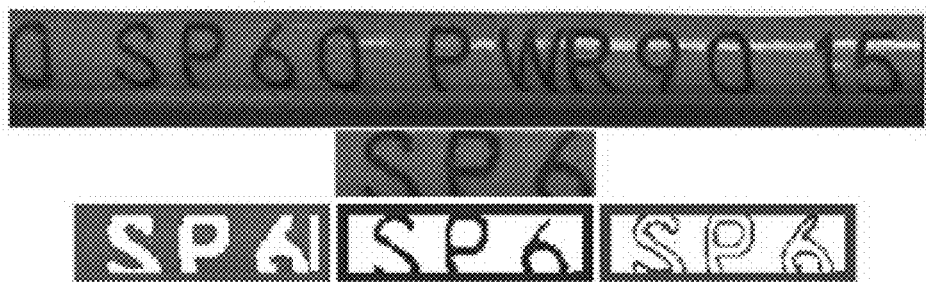
Figure 8C:
Figure 9A:
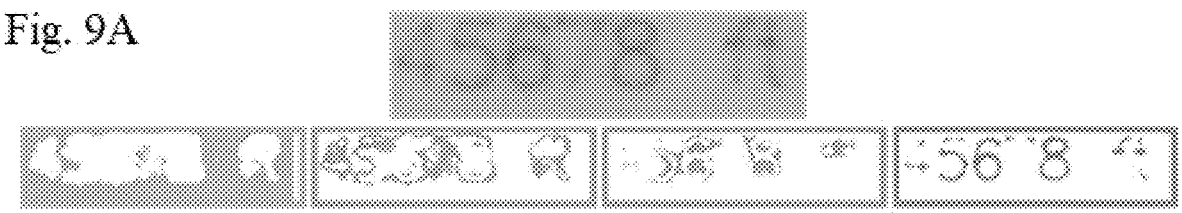
FIGS. 9A-9C shows results from the k-clustering analyses used to calculate contrast ratio of laser marked samples having a nominally yellow background color (Examples 6, 16, and 26, respectively).
Figure 9B:
Figure 9C:
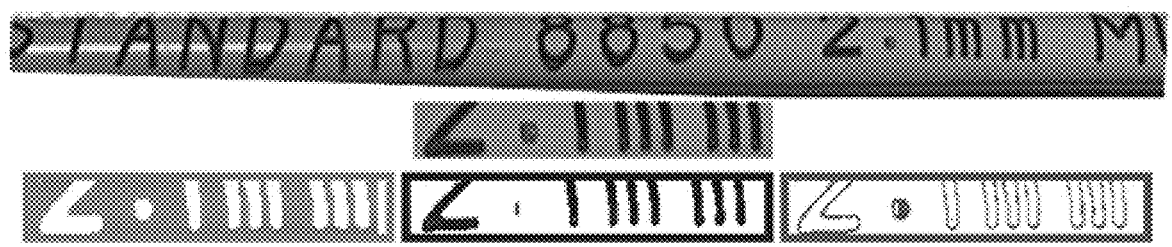
Figure 10A:
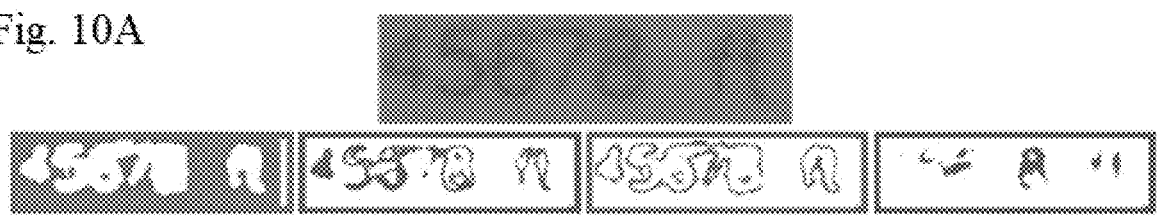
FIGS. 10A-10C shows results from the k-clustering analyses used to calculate contrast ratio of laser marked samples having a nominally green background color (Examples 7, 17, and 27, respectively).
Figure 10B:
Figure 10C:
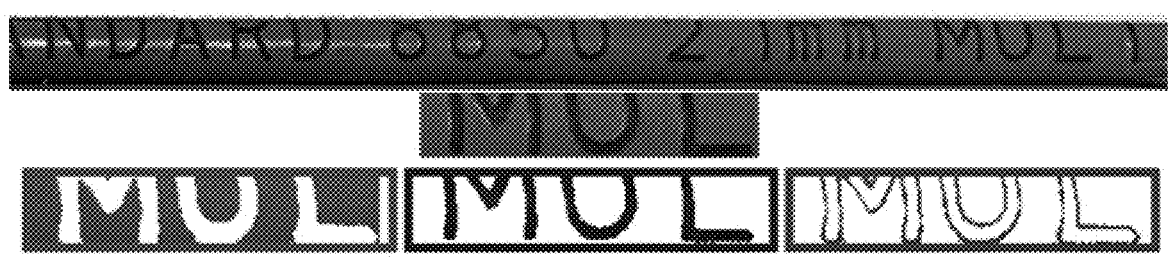
Figure 11A:
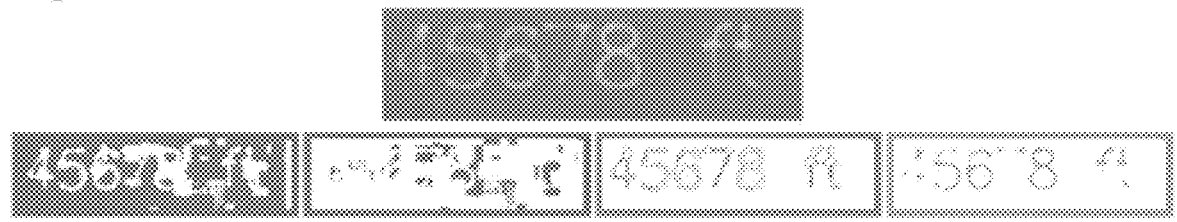
FIGS. 11A-11C shows results from the k-clustering analyses used to calculate contrast ratio of laser marked samples having a nominally gray background color (Examples 8, 18, and 28, respectively).
Figure 11B:
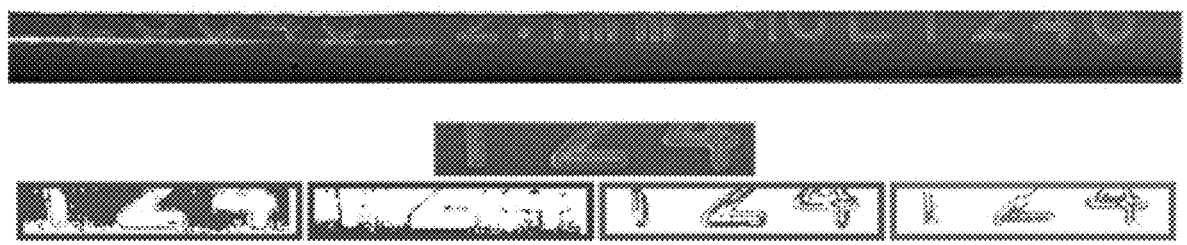
Figure 11C:
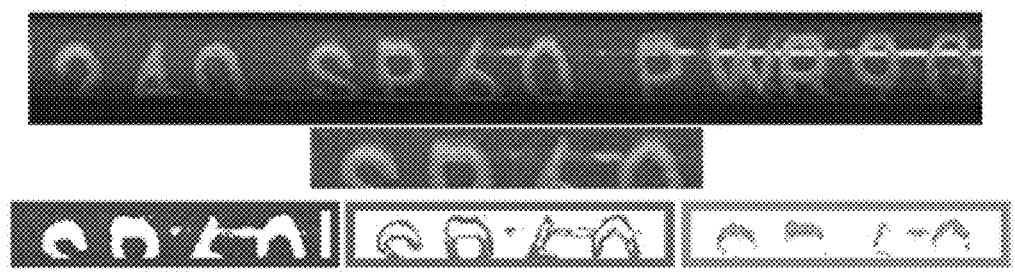
Figure 12A:
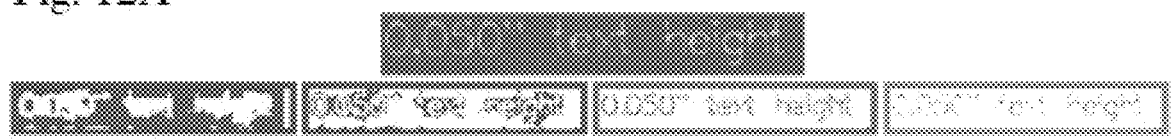
FIGS. 12A-12B shows results from the k-clustering analyses used to calculate contrast ratio of laser marked samples having a nominally brown background color (Examples 9 and 31, respectively).
Figure 12B:
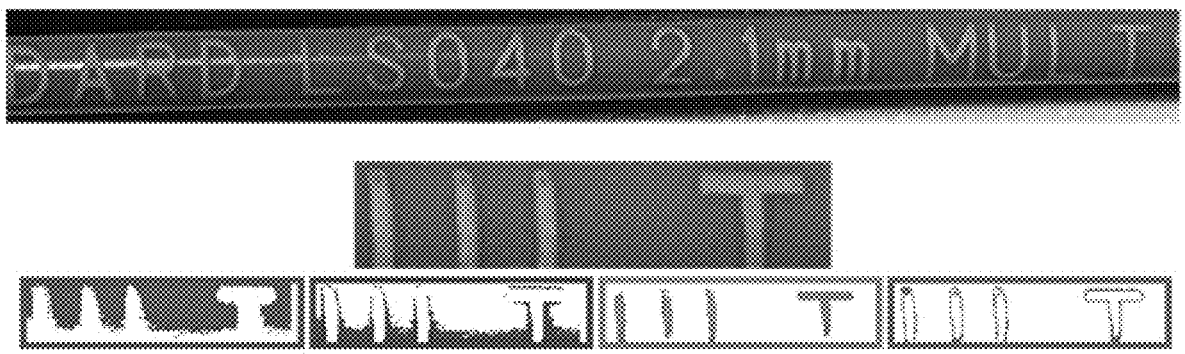
Figure 13:
FIG. 13 shows results from the k-clustering analysis used to calculate contrast ratio of laser marked samples having a nominally tan background color (Example 32).
Figure 14A:
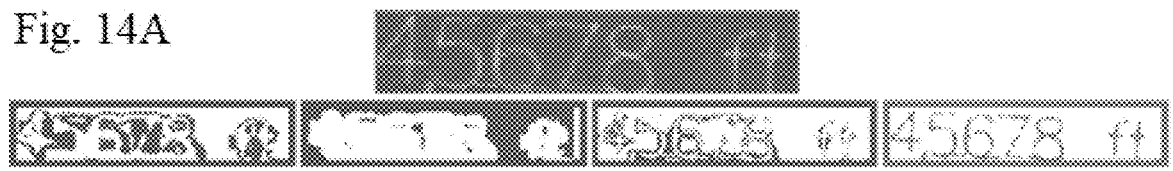
FIGS. 14A-14C shows results from the k-clustering analyses used to calculate contrast ratio of laser marked samples having a nominally purple background color (Examples 10, 20, and 30, respectively).
Figure 14B:
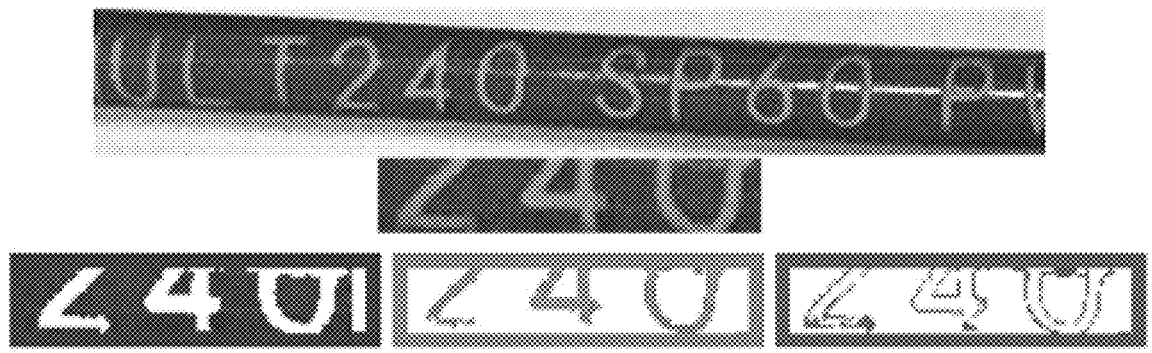
Figure 14C:
Figure 15A:
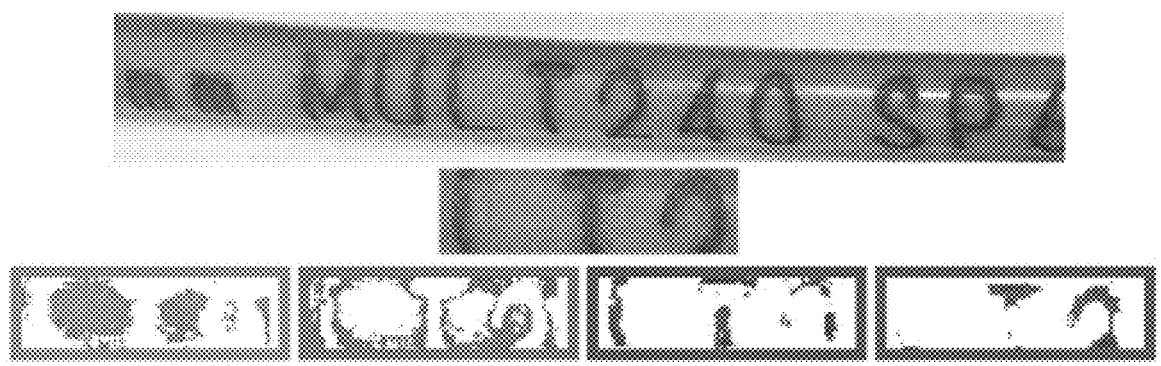
FIGS. 15A-15B shows results from the k-clustering analyses used to calculate contrast ratio of laser marked samples having a nominally pink background color (Examples 19 and 29, respectively).
Figure 15B:
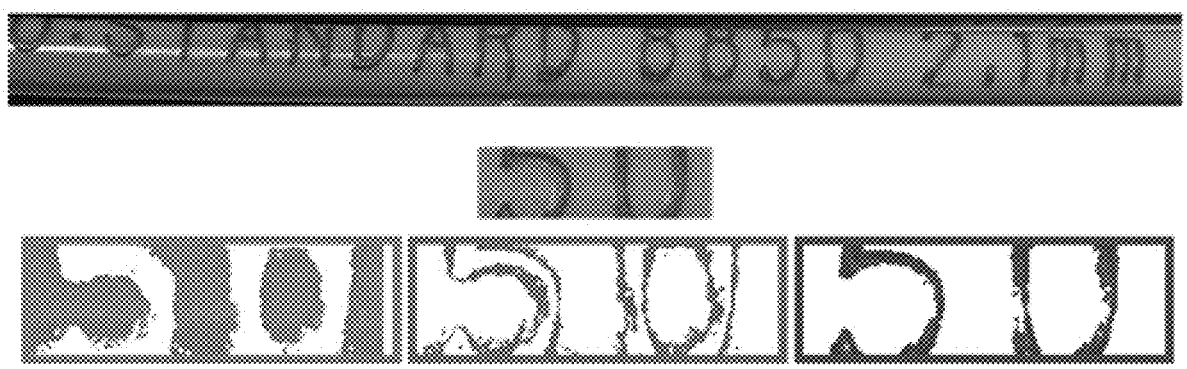

For each of Examples 1-32, an unfiltered photograph of the marked sample was taken using the camera of an iphone XR® using factory settings. Photos for each example are displayed in FIGS. 1-3. Each of the resulting photos was compared against the marked sample to visually identify a segment of the photo that appeared most representative of the marked sample. Care was taken to exclude glare and shading from the representative segments. For Examples 1 and 2 the entire sample was considered to be representative, and the entire sample was evaluated.

For each representative segment, k-means clustering was applied to group individual pixels of the representative sample based on the similarity of their RGB values. Typically, three clusters were created, corresponding to a color of an unmarked background portion of the cable, a foreground color representing the color of the laser mark, and an outline color representing the border between the background and foreground. Certain examples benefited from the creation of additional clusters to further isolate separate digital artifacts remaining within the representative segment unable to be excluded by the sample selection process described above.

Results of this segment selection and subsequent clustering are shown in FIGS. 4-15. As is shown, each of the clusters generated for Examples 1-32 generally contain similarly colored pixels, with low variability in color within any single cluster.

As part of the k-clustering analysis, a representative average RGB value was calculated for each cluster. A contrast ratio was calculated for each example by comparing two of the clusters, typically those with the highest contrast, and comparing their average RGB values using standard contrast calculations published within the Web Content Accessibility Guidelines (WCAG) v2.1. Online tools available for this calculation are provided at WCAG v2.1 "Related Resources." Clusters were selected based on those that gave the highest contrast. This approach was justified by considering that the effective contrast for the mark would be that determined by comparing the foreground color with the most different of the background and the outline colors. Specifically, for examples where the outline provides less contrast against the foreground than the background, the foreground and background would appear adjacent. Alternatively, the outline would appear adjacent to the foreground where higher contrast is present.

Comparative Examples 1-10. Nylon Coupons Having 4 wt. % Marking Additive

Polyamide coupon samples consistent with the composition and color of previously marketed SIMpull® cables underwent the laser marking procedures as described generally above, and according to the parameters given in Table 1. The composition and color of the marked polyamide coupons of Examples 1-10 are described by Table 1. The amount of color concentrate in each example is equivalent in structure and amount to that used in conventional SIMpull® cables. As is shown, each of Examples 1-10 further comprised 4 wt. % of a laser marking additive, intended to create a light or dark mark on the sample, respectively. Laser marking additives used to create a light-colored mark included Iriotec® 8825 ("8825"), and Fabulase® 361 ("F361"). Laser marking additives used to create a dark-colored mark included Iriotec® 8208 ("8202").

TABLE 1

Composition of Comparative Examples 1-10.

| Ex. | Color concentrate | Background RGB values | Foreground RGB values | Marking Additive | Amount Marking Additive |
|---|---|---|---|---|---|
| 1 | Carbon black | (66, 63, 60) | (174, 172, 164) | 8825 | 4.0 |
| 2 | SIMpull white | (201, 201, 201) | (151, 147, 143) | 8208 | 4.0 |
| 3 | SIMpull red | (174, 80, 75) | (193, 106, 102) | F361 | 4.0 |
| 4 | SIMpull blue | (74, 107, 168) | (107, 135, 182) | 8825 | 4.0 |
| 5 | SIMpull orange | (194, 117, 36) | (176, 106, 33) | 8208 | 4.0 |
| 6 | SIMpull yellow | (203, 201, 95) | (172, 168, 77) | 8208 | 4.0 |
| 7 | SIMpull green | (63, 181, 90) | (70, 145, 80) | 8208 | 4.0 |
| 8 | SIMpull gray | (142, 142, 143) | (108, 181, 179) | 8825 | 4.0 |
| 9 | SIMpull brown | (144, 108, 75) | (188, 156, 126) | 8825 | 4.0 |
| 10 | SIMpull purple | (102, 99, 161) | (138, 136, 177) | 8825 | 4.0 |

Table 2 below shows characteristics of the laser marking procedures specific to Examples 1-10, including energy density, pulse frequency and the associated maximum energy of each pulse. Contrast ratios calculated for each example are also shown. Pictures of the marked samples of Examples 1-10 are included as FIG. 1.

TABLE 2

Laser marking parameters for Comparative Examples 1-10.

| Ex. # | Nominal Color | Scan Speed (mm/s) | Laser Power (avg) | Pulse Freq (kHz) | $E_{max}$ (mJ) | Energy Density (kJ/cm$^2$) | Amount Marking Additive | Contrast Ratio |
|---|---|---|---|---|---|---|---|---|
| 1 | Black | 4000 | 14 | 76 | 0.53 | 0.2 | 4.0% | 4.60 |
| 2 | White | 4000 | 28 | 76 | 0.53 | 0.4 | 4.0% | 1.84 |
| 3 | Red | 2000 | 31.5 | 30 | 1.33 | 0.8 | 4.0% | 1.36 |
| 4 | Blue | 2500 | 31.5 | 30 | 1.33 | 0.7 | 4.0% | 1.45 |
| 5 | Orange | 4000 | 28 | 76 | 0.53 | 0.4 | 4.0% | 1.18 |
| 6 | Yellow | 4000 | 24.5 | 70 | 0.57 | 0.3 | 4.0% | 1.42 |
| 7 | Green | 4000 | 28 | 76 | 0.53 | 0.4 | 4.0% | 1.46 |
| 8 | Gray | 4000 | 31.5 | 76 | 0.53 | 0.4 | 4.0% | 1.38 |
| 9 | Brown | 2500 | 31.5 | 47 | 0.85 | 0.7 | 4.0% | 1.84 |
| 10 | Purple | 1800 | 31.5 | 47 | 0.85 | 0.9 | 4.0% | 1.61 |

As is shown by Table 2, only Example 1 representing a nominally black cable was successful in generating a contrast ratio of at least 2. Examples 2-10 were unable to generate a legible mark with sufficiently high contrast. Marking of Examples 3-8 conducted on red, blue, orange, yellow, green, and gray coupons resulted in a particularly poor contrast, and the resulting marked samples were barely legible.

Comparisons of the contrast between samples demonstrate the difficulty in marking is highly specific to the background color of the cable, and the color concentrate present. Each of Examples 2-10 demonstrated poor contrast despite varying energy density and a constant amount of marking additive. Comparing Examples 2 and 5 having a white background or orange background were marked under an identical method parameters, yet show quite different contrasts.

Inventive Examples 11-20. SIMpull Cables with Alternative Color Concentrates and Reduced Marking Additives Taking results from Examples 1-10 as a baseline, cable sheathing compositions were prepared in samples of SIMpull cables with altered amounts of laser marking additive, color concentrates producing a different background color, and laser marking methodologies. Details of each sample are shown in Table 3 below. Compared to Examples 1-10, Examples 11-20 had a lower amount of marking additives. Notably, black and gray samples (Examples 11 and 18) contained only 0.15 wt. % of the laser marking additive.

The laser marking additive used was also varied in Examples 11-13 and 15-18. Laser marking additives used to create a light-colored mark included Iriotec® 8825 ("8825") and LaserSafe 040 ("LS040"). Laser marking additives used to create a dark-colored mark included Iriotec® 8250 ("8250"). The background color in several examples was also varied with respect to analogous Examples 1-10. For instance Example 14 is a somewhat deeper shade of blue than Example 4, as reflected by comparing FIGS. 1 and 2 as well as the respective RGB values.

TABLE 3

Composition of Inventive Examples 11-20.

| Ex. | Color concentrate | Background RGB values | Foreground RGB values | Marking Additive | Amount Marking Additive |
|---|---|---|---|---|---|
| 11 | Carbon black | (28, 23, 23) | (191, 168, 138) | LS040 | 0.15% |
| 12 | SIMpull white | (220, 220, 205) | (108, 97, 85) | 8850 | 0.75% |
| 13 | SIMpull red | (174, 89, 86) | (205, 120, 117) | 8825 | 0.75% |
| 14 | SIMpull blue | (35, 73, 133) | (127, 145, 166) | 8825 | 0.50% |
| 15 | SIMpull orange | (188, 62, 34) | (92, 38, 27) | 8850 | 0.75% |
| 16 | SIMpull yellow | (212, 193, 63) | (72, 56, 26) | 8850 | 0.75% |
| 17 | SIMpull green | (41, 111, 72) | (41, 58, 50) | 8850 | 0.75% |
| 18 | SIMpull gray | (90, 80, 69) | (166, 154, 131) | LS040 | 0.15% |
| 19 | SIMpull pink | (208, 129, 125) | (144, 88, 81) | 8850 | 0.75% |
| 20 | SIMpull purple | (101, 53, 81) | (172, 128, 142) | 8825 | 0.50% |

Table 4 below shows characteristics of the laser marking procedures specific to Examples 11-20, including energy density, pulse frequency and the associated maximum energy of each pulse. Contrast ratios calculated for each example are also shown. Pictures of the marked samples of Examples 11-20 are included as FIG. 2.

TABLE 4

Laser marking parameters for Inventive Examples 11-20.

| Ex. # | Nominal Color | Scan Speed (mm/s) | Laser Power (avg) | Pulse Freq (kHz) | $E_{max}$ (mJ) | Energy Density (kJ/cm$^2$) | Amount Marking Additive | Contrast Ratio |
|---|---|---|---|---|---|---|---|---|
| 11 | Black | 1800 | 18 | 20 | 2.00 | 0.8 | 0.15% | 7.75 |
| 12 | White | 1800 | 18 | 20 | 2.00 | 0.8 | 0.75% | 4.35 |
| 13 | Red | 1800 | 18 | 20 | 2.00 | 0.9 | 0.75% | 1.49 |
| 14 | Blue | 1800 | 18 | 20 | 2.00 | 0.9 | 0.50% | 2.75 |
| 15 | Orange | 3000 | 18 | 20 | 2.00 | 0.5 | 0.75% | 2.20 |
| 16 | Yellow | 1800 | 18 | 20 | 2.00 | 0.9 | 0.75% | 6.19 |
| 17 | Green | 3000 | 18 | 20 | 2.00 | 0.5 | 0.75% | 1.98 |
| 18 | Gray | 1800 | 18 | 20 | 2.00 | 0.9 | 0.15% | 2.83 |
| 19 | Pink | 1800 | 18 | 20 | 2.00 | 0.9 | 0.75% | 1.92 |
| 20 | Purple | 1800 | 18 | 20 | 2.00 | 0.9 | 0.50% | 2.85 |

Surprisingly, significant increases in the contrast ratio were achieved for most samples were achieved, despite lowering the amount of laser marking additive, typically approximately 5-10 fold. These increases were also accompanied by only a slight increase in energy density required to make the mark. For instance, Example 15 (orange) shows about a 5-fold reduction in laser marking additive compared to Example 5, yet the contrast ratio is increased from 1.18 to 2.20.

Without being bound by theory, these increases may be the result of several factors that determine whether a particular article may be marked sufficiently. Such factors may include (i) the nature and method of applying the laser energy, (ii) the absorption of laser energy by the marking additive (and potentially other additives) in the markable layer, (iii) the hue of the pigmented marking layer, and (iv) the hue of the resulting laser mark.

Also significant is that each of the examples were able to generate a legible mark despite the presence of the lubricating additive on the surface and throughout the nylon coupon. While only Example 1 of the comparative examples exhibited a high contrast mark in the presence of the lubricating additive, each of Examples 11-20 including light and dark colors were demonstrated to be marked with high contrast. Even more surprisingly, the marks in Examples 11-20 were made without reducing the scanning speed significantly, such that the laser marking processes can be implemented seamlessly within high speed cable manufacturing processes.

Inventive Examples 21-32. SIMpull Cables with Reduced Marking Additives

Inventive Examples 21-32 represent further efforts to identify combinations of background colors, laser marking methods, and laser marking additives that provide high contrast marks with a minimum amount of marking additive present in the cable sheathing composition. Pictures of each Example used in the contrast ratio analysis are provided in FIG. 3. Each of Examples 21-32 were prepared similar to Examples 11-20, as samples of SIMpull cable with unique formulations of cable sheathing. Table 5 below provides detail of color concentrate, color, marking additives, and amounts of additives. Details of the laser marking methods and color contrast analyses are provided in Table 6.

Significantly, Example 21 was conducted without laser marking additive. Without being bound by theory, the excellent marking of black cables, both within and outside the presence of traditional marking additives, may be due at least in part to the presence of a significant amount carbon black (e.g. up to 40 wt. %) in the cable sheathing. The carbon black may be acting as a foaming agent and inducing a light colored mark within the cable sheathing, without additional or dedicated laser marking additives.

Each of Examples 21-32 have a contrast ratio of 1.9 or greater, irrespective of the background color. As is shown in the Table 3A, the energy density of each laser marking procedure is increased relative to previous examples 2-3 fold. This relatively small increase in energy density has led to a significant reduction in laser marking additive, and also increased contrast in certain cases. FIGS. 3-15 provide side by side comparisons of each of the Examples with their analogous colors. The improvement in contrast ratio for Examples 21-32 is apparent in FIG. 3.

TABLE 5

Composition of Inventive Examples 21-32.

| Ex. | Color concentrate | Color concentrate (wt. %) | Background RGB values | Foreground RGB values | Marking Additive | Amount Marking Additive |
|---|---|---|---|---|---|---|
| 21 | N/A | N/A | (15, 13, 7) | (170, 154, 120) | N/A | N/A |
| 22 | HC82112N | 2.5 | (177, 166, 139) | (115, 99, 74) | 8850 | 0.38 |
| 23 | HC74115N | 2.5 | (112, 21, 5) | (164, 86, 62) | 8825 | 0.43 |
| 24 | HC24659N | 2.5 | (44, 56, 79) | (98, 102, 102) | LS040 | 0.3 |
| 25 | HC51546N | 2.5 | (156, 81, 25) | (64, 34, 11) | 8850 | 0.25 |
| 26 | HC92233N | 2.5 | (158, 148, 58) | (60, 46, 14) | 8850 | 0.38 |
| 27 | HC43699N | 2.5 | (19, 112, 42) | (28, 44, 14) | 8850 | 0.25 |
| 28 | HC32475N | 2.5 | (82, 77, 67) | (135, 125, 101) | LS040 | 0.15 |
| 29 | HC14563N | 2.5 | (176, 122, 100) | (112, 79, 55) | LS040 | 0.15 |
| 30 | HC73983N | 2.5 | (95, 59, 92) | (135, 106, 110) | 8850 | 0.38 |
| 31 | HC61509N | 2.5 | (128, 72, 24) | (171, 135, 98) | LS040 | 0.3 |
| 32 | HC32476N | 2.5 | (176, 135, 93) | (86, 64, 42) | 8850 | 0.38 |

TABLE 6

Laser marking parameters for Inventive Examples 21-32.

| Ex. # | Nominal Color | Scan Speed (mm/s) | Laser Power (avg) | Pulse Freq (kHz) | $E_{max}$ (mJ) | Energy Density (kJ/cm$^2$) | Amount Marking Additive | Contrast Ratio |
|---|---|---|---|---|---|---|---|---|
| 21 | Black | 1000 | 27.1 | 15 | 2.67 | 1.7 | N/A | 7.03 |
| 22 | White | 1000 | 27.1 | 15 | 2.67 | 1.7 | 0.38 | 2.40 |
| 23 | Red | 1000 | 27.1 | 15 | 2.67 | 1.7 | 0.43 | 2.21 |
| 24 | Blue | 1000 | 27.1 | 15 | 2.67 | 1.7 | 0.3 | 2.02 |
| 25 | Orange | 1000 | 27.1 | 15 | 2.67 | 1.7 | 0.25 | 2.48 |
| 26 | Yellow | 1000 | 27.1 | 15 | 2.67 | 1.7 | 0.38 | 4.24 |
| 27 | Green | 1000 | 27.1 | 15 | 2.67 | 1.7 | 0.25 | 2.38 |
| 28 | Gray | 1000 | 27.1 | 15 | 2.67 | 1.7 | 0.15 | 2.05 |
| 29 | Pink | 1000 | 27.1 | 15 | 2.67 | 1.7 | 0.15 | 2.03 |
| 30 | Purple | 1000 | 27.1 | 15 | 2.67 | 1.7 | 0.38 | 1.90 |
| 31 | Brown | 1000 | 27.1 | 15 | 2.67 | 1.7 | 0.3 | 2.23 |
| 32 | Tan | 1000 | 18 | 20 | 2.00 | 1.5 | 0.38 | 2.99 |

We claim:

1. A laser marking method comprising:
   focusing a laser source onto a markable portion of a cable sheathing, the cable sheathing comprising a lubricating additive;
   emitting an electromagnetic radiation from the laser source and onto the markable portion; and
   forming an indelible mark on the markable portion of the cable sheathing;
   wherein:
   an amount of the electromagnetic radiation emitted onto the markable portion is less than about from about 0.01 kJ/m$^2$ to about 2 kJ/m$^2$; and
   the cable sheathing contains less than 0.5 wt. % of a laser marking additive; and
   a contrast ratio between a color of the indelible mark and a background color of the cable sheathing is at least about 2.

2. The laser marking method of claim 1, wherein:
   the laser source is a Yb:fiber laser; and
   the electromagnetic radiation has:
   a wavelength of about 1064 nm;
   a pulse frequency in a range from about 15 kHz to 200 kHz;
   an average power in a range from about 1 W to about 50 W; and
   a pulse duration of about 10 ns to about 1 ms; and
   a width of the indelible mark corresponds to a line width in a range from about 50 nm to about 1 mm.

3. The laser marking method of claim 1, wherein focusing the laser source onto a markable portion of the cable comprises:
   scanning the laser at a scan speed of at least about 500 mm/sec; and
   moving the cable sheathing along a longitudinal axis of a cable comprising the cable sheathing, and relative to a stationary laser marking field, at a line speed in a range from about 50 to 1000 feet per minute.

4. The method of claim 1, wherein the lubricating additive comprises a fatty acid, a fatty amide, a hydrocarbon oil, a fluorinated organic resin, a plasticizer, or a combination thereof.

5. The method of claim 4, wherein the lubricating additive is selected from the group consisting of erucamide, oleamide, oleyl palmitamide, stearyl stearamide, stearamide, behenamide, ethylene bisstearamide, ethylene bisoleamide, stearyl erucamide, and erucyl stearamide, or any combination thereof.

6. The method of claim 4, wherein the lubricating additive comprises mineral oil, silicone oil, or both.

7. The method of claim 1, wherein the cable sheathing comprises an organic polymer, the organic polymer comprises a polyolefin, a polyester, a polycarbonate, a polyamide, a polyether ketone, a polyetherimide, a polyarylene ketone, a liquid crystal polymer, a polyarylene sulfide, a polyacetal, a polyurethane, a polycarbonate, a styrenic polymer, or combinations thereof.

8. The method of claim 7, wherein the organic polymer is a polyamide.

9. The method of claim 1, wherein the cable sheathing further comprises a laser marking additive.

10. The method of claim 9, wherein an amount of the laser marking additive in the cable sheathing is in a range from about 0.05 wt. % to about 1 wt. %.

11. The method of claim 10, wherein the amount of the laser marking additive is in a range from about 0.15 wt. % to about 0.75 wt. %.

12. The method of claim 9, wherein the laser marking additive is a charring additive comprising Iriotec® 8208, Iriotec® 8850, or a combination thereof.

13. The method of claim 12, wherein:
the background color is white and/or has an RGB value of RGB(177,166, 139) or any RGB value having an RGB differentiation therefrom of less than 30;
the background color is orange and/or has an RGB value of RGB(156,81,25) or any RGB value having an RGB differentiation therefrom of less than 30;
the background color is yellow and/or has an RGB value of RGB(158,148,58) or any RGB value having an RGB differentiation therefrom of less than 30;
the background color is green and/or has an RGB value of RGB(19,112,42) or any RGB value having an RGB differentiation therefrom of less than 30;
the background color is pink and/or has an RGB value of RGB(176,122, 100) or any RGB value having an RGB differentiation therefrom of less than 30; or
the background color is tan and/or has an RGB value of RGB(176,135,93) or any RGB value having an RGB differentiation therefrom of less than 30.

14. The method of claim 9, wherein the laser marking additive is a foaming additive comprising Iriotec® 8825, Fabulase® 361, LaserSafe 040, or any combination thereof.

15. The method of claim 14, wherein:
the background color is black and/or has an RGB value of RGB(15,13,7) or any RGB value having an RGB differentiation therefrom of less than 30;
the background color is red and/or has an RGB value of RGB(130,26,10) or any RGB value having an RGB differentiation therefrom of less than 30;
the background color is blue and/or has an RGB value of RGB(46,65,96) or any RGB value having an RGB differentiation therefrom of less than 30;
the background color is gray and/or has an RGB value of RGB(89,86,75) or any RGB value having an RGB differentiation therefrom of less than 30;
the background color is purple and/or has an RGB value of RGB(95,59,92) or any RGB value having an RGB differentiation therefrom of less than 30; or
the background color is brown and/or has an RGB value of RGB(145,84,29) or any RGB value having an RGB differentiation therefrom of less than 30.

16. The method of claim 10, wherein:
the amount of the electromagnetic radiation emitted onto the markable portion is in a range from about 0.01 $kJ/cm^2$ to about 2 $kJ/cm^2$;
the amount of the laser marking additive is less than 0.5 wt. %; and
the contrast ratio between a color of the indelible mark and the background color is in a range from about 2 to about 4.

17. The method of claim 16, wherein:
the background color is selected from:
yellow and/or has an RGB value of RGB(158,148,58) or any RGB value having an RGB differentiation therefrom of less than 30;
gray and/or has an RGB value of RGB(89,86,75) or any RGB value having an RGB differentiation therefrom of less than 30; or
pink and/or has an RGB value of RGB(176,122,100) or any RGB value having an RGB differentiation therefrom of less than 30;
the amount of the laser marking additive is less than about 0.2 wt. %; and
the contrast ratio between a color of the indelible mark and the background color is in a range from about 2 to about 4.

18. The method of claim 16, wherein:
the background color is selected from:
orange and/or has an RGB value of RGB(156,81,25) or any RGB value having an RGB differentiation therefrom of less than 30;
green and/or has an RGB value of RGB(19,112,42) or any RGB value having an RGB differentiation therefrom of less than 30;
tan and/or has an RGB value of RGB(176,135,93) or any RGB value having an RGB differentiation therefrom of less than 30;
the amount of the laser marking additive is less than about 0.3 wt. %; and
the contrast ratio between a color of the indelible mark and the background color is in a range from about 2 to about 4.

* * * * *